(12) United States Patent
Kajikawa et al.

(10) Patent No.: US 10,301,398 B2
(45) Date of Patent: May 28, 2019

(54) PRODUCTION METHOD OF WATER ABSORBENT RESIN POWDER AND PACKAGE OF WATER ABSORBENT RESIN POWDER

(75) Inventors: Katsuhiro Kajikawa, Himeji (JP); Sumio Okuda, Ibo-gun (JP); Kazumasa Konishi, Himeji (JP); Kunihiko Ishizaki, Suita (JP)

(73) Assignee: Nippon Shokubai Co., Ltd., Osaka (JP)

(*) Notice: Subject to any disclaimer, the term of this patent is extended or adjusted under 35 U.S.C. 154(b) by 761 days.

(21) Appl. No.: 12/308,803

(22) PCT Filed: Jul. 19, 2007

(86) PCT No.: PCT/JP2007/064622
§ 371 (c)(1),
(2), (4) Date: Dec. 23, 2008

(87) PCT Pub. No.: WO2008/015946
PCT Pub. Date: Feb. 7, 2008

(65) Prior Publication Data
US 2009/0321682 A1    Dec. 31, 2009

(30) Foreign Application Priority Data
Jul. 31, 2006   (JP) ................................. 2006-208929

(51) Int. Cl.
*C08F 2/10* (2006.01)
*C08J 7/12* (2006.01)

(52) U.S. Cl.
CPC ................. *C08F 2/10* (2013.01); *C08J 7/123* (2013.01)

(58) Field of Classification Search
CPC .................................... C08F 2/10; C08J 7/123
USPC .......................... 522/150, 104, 107, 149, 153
See application file for complete search history.

(56) References Cited

U.S. PATENT DOCUMENTS

| | | | |
|---|---|---|---|
| 4,657,144 A | 4/1987 | Martin et al. | |
| 6,359,049 B1 | 3/2002 | Carrico et al. | |
| 6,444,744 B1 | 9/2002 | Fujimaru et al. | |
| 6,497,324 B1 * | 12/2002 | Doak et al. | 209/522 |
| 6,562,879 B1 * | 5/2003 | Hatsuda et al. | 521/56 |
| 6,716,894 B2 | 4/2004 | Kajikawa et al. | |
| 6,784,996 B2 * | 8/2004 | Ikeda et al. | 356/406 |
| 7,193,006 B2 * | 3/2007 | Ishizaki et al. | 524/500 |
| 2003/0087983 A1 | 5/2003 | Kajikawa et al. | |
| 2004/0110006 A1 | 6/2004 | Ishizaki et al. | |
| 2004/0110914 A1 * | 6/2004 | Nakahara et al. | 526/317.1 |
| 2005/0085604 A1 | 4/2005 | Handa et al. | |
| 2006/0089611 A1 | 4/2006 | Herfert et al. | |
| 2007/0041796 A1 | 2/2007 | Irie et al. | |
| 2007/0149691 A1 | 6/2007 | Ishizaki et al. | |

FOREIGN PATENT DOCUMENTS

| | | |
|---|---|---|
| EP | 1426402 A2 | 6/2004 |
| JP | 61-71878 | 4/1986 |

OTHER PUBLICATIONS

Japanese Industrial Standard, "Pulps—Foreign Matter Measuring Method JIS P 8208 :1998 Pulps—Estimation of contraries", (with partial English translation).
Japanese Industrial Standard, "Pulps—Foreign Matter Measuring Method JIS P 8208 :1998 Pulps—Estimation of contraries", (partial English translation).
International Search Report in Corresponding European Patent Application 07768475.1 dated Feb. 22, 2012.

* cited by examiner

*Primary Examiner* — Amina S Khan
(74) *Attorney, Agent, or Firm* — Locke Lord LLP; James E. Armstrong, IV; Nicholas J. DiCeglie, Jr.

(57) ABSTRACT

A method according to the present invention for producing water absorbent resin powder is a method for producing water absorbent resin having a surface cross-linked structure, and includes: a polymerization step in which an unsaturated monomer aqueous solution is polymerized; a drying step in which a hydrogel cross-linked polymer obtained in the polymerization step is dried; a surface treatment step in which the hydrogel cross-linked polymer or a dried hydrogel cross-linked polymer is subjected to a surface treatment; and a sorting step, carried out after the drying step, in which a foreign matter included in a water absorbent resin is color-sorted from the water absorbent resin entirely or partially. As a result, it is possible to obtain a water absorbent resin which has high properties and is less likely to be colored. In this way, there is provided the water absorbent resin powder production method in which the color sorting technique is used to remove foreign matters from the water absorbent resin.

14 Claims, 1 Drawing Sheet

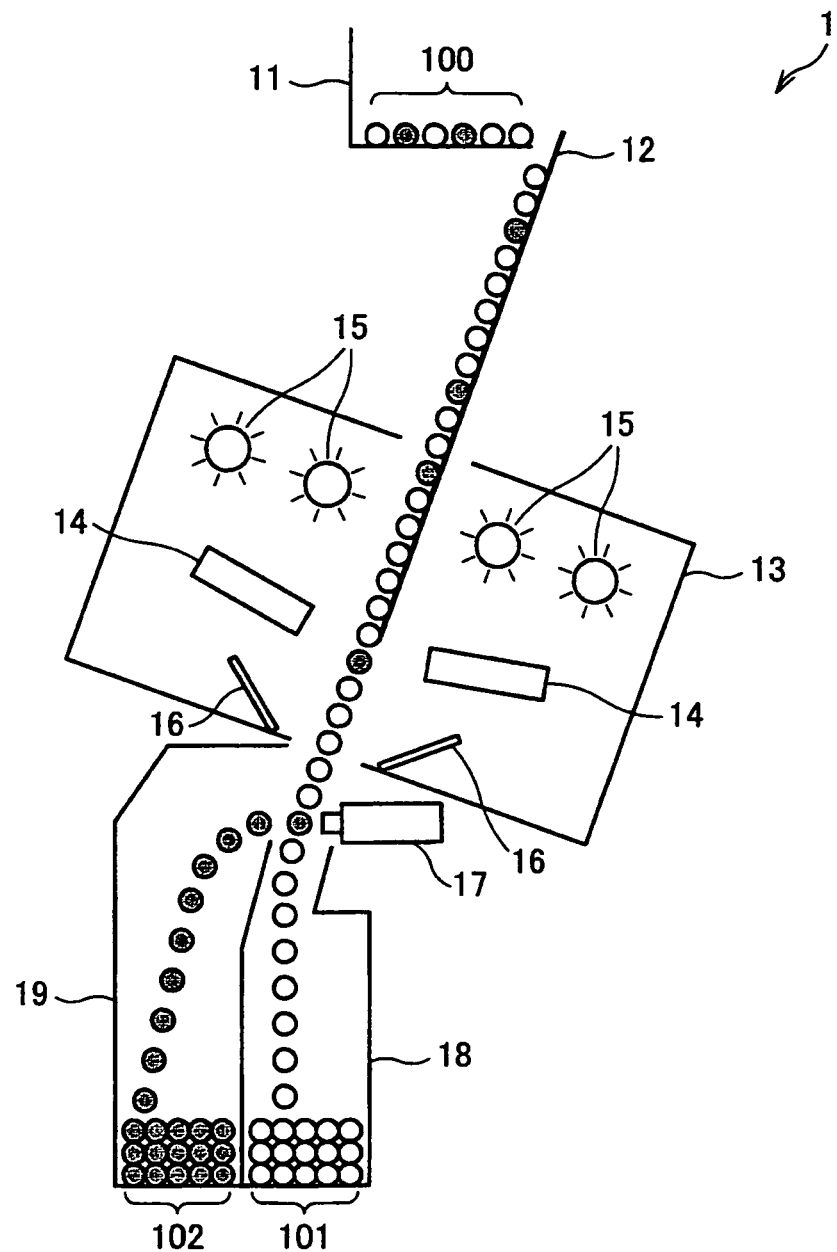

PRODUCTION METHOD OF WATER ABSORBENT RESIN POWDER AND PACKAGE OF WATER ABSORBENT RESIN POWDER

TECHNICAL FIELD

The present invention relates to (i) a production method of water absorbent resin powder which method adopts a color sorting technique so as to remove foreign matters contained in a water absorbent resin and (ii) a package of water absorbent resin powder having less foreign matters and high properties.

BACKGROUND ART

A water absorbent resin is a white resin represented by a cross-linked polyacrylic acid polymer, and it is general that a form of the water absorbent resin is powder. The water absorbent resin, particularly water absorbent resin powder is used as a sanitary material absorbing agent for a sanitary napkin, a disposable diaper, and the like. Further, the water absorbent resin is used for wide variety of purposes, e.g., a water retaining agent, a dehydrating agent, and the like in an agriculture/horticulture field, a civil engineering and construction field, and a similar field. However, if the water absorbent resin is left for a long time, this raises such a problem that an external factor such as heat and moisture causes the water absorbent resin to be colored yellow or brown. Particularly in the sanitary material field, when the water absorbent resin (powder) of a water absorbing article such as a disposable diaper, a sanitary napkin, and the like is colored, the colored water absorbent resin in a white pulp causes a consumer to regard the resin as having foreign substances, which significantly drops its commercial value as the water absorbing article. Thus, the water absorbent resin is required to be white not only at the time of shipment but also on a permanent basis.

Therefore, there have been proposed several methods each of which prevents the water absorbent resin from being colored even in case where the water absorbent resin is reserved for an extended period of time at high temperature and high humidity. Examples of the methods include: a method in which an inorganic reducer and metal salt are added to the water absorbent resin (Patent Document 1); a method in which sulfinic acid is added as a reducer at the time of polymerization (Patent Document 2); a method in which an aminocarboxylate metal chelating agent and an oxidizing agent or a reducer are added (Patent Document 3); a method in which hydroquinones, i.e., impurities of acrylic acid used in polymerization are controlled (Patent Document 4); a method in which methoxyphenols, i.e., inhibitor of acrylic acid used in polymerization are controlled (Patent Document 5); and the like.

Further, it is natural that the commercial value of the water absorbent resin is decreased by the aforementioned coloring. Also, it is known that: if a metallic foreign substance is slightly included in the water absorbent resin, this causes deterioration of water absorbing performance, so that the commercial value of the water absorbent resin decreases. In order to remove the metallic foreign substance slightly included in the water absorbent resin, a method in which a magnetic line is emitted to the water absorbent resin (specifically, a method using an iron remover) is proposed as a particularly effective method (Patent Document 6). Further, there is proposed a property stabilization method in which a product whose property is below or above a certain property is sorted and the sorted product is mixed with an original product so as to stabilize a property such as an absorbency under load (Patent Document 7).

Further, also a method in which a rotary sorting apparatus is used to remove agglomerates each of which has a large particle diameter (Patent Document 8) is proposed.

[Patent Document 1]
U.S. Pat. No. 6,359,049
[Patent Document 2]
WO2004/084962 (corresponding U.S. Patent Publication No. 2006-089611)
[Patent Document 3]
European Patent No. 1466928 (corresponding U.S. Patent Publication No. 2005-085604)
[Patent Document 4]
U.S. Pat. No. 6,444,744
[Patent Document 5]
U.S. Patent Publication No. 2004-0110914
[Patent Document 6]
U.S. Pat. No. 6,716,894
[Patent Document 7]
U.S. Patent Publication No. 2004-0110006
[Patent Document 8]
U.S. Patent Publication No. 2007-041796

DISCLOSURE OF INVENTION

Each of the techniques described in Patent Documents 1 to 5 focuses on a color of entire particles of water absorbent resin and is to reduce browning and yellowing of the entire particles. In this technique, numerical values' are used as color indexes (YI value, Lab value) of the entire particles. On the other hand, in view of an influence the coloring of the water absorbent resin has on the human visual sense, black or yellow foreign matters slightly included in the particles have recently attracted more attentions than the browning or the yellowing of the entire particles have, so that it was found that the foreign matters (existence of several color particles) have greater influence.

That is, if the foreign matters are not removed and remain in the product, the foreign matters do not influence the safety of the product but the human visual sense intensely percepts particles of the foreign matters dotted in white water absorbent resin powder though the entire particles have the same color indexes (YI value, Lab value), so that the appearance of the foreign matters causes the human visual sense to feel that the whiteness of the water absorbent resin is insufficient. Such a water absorbent resin causes the consumer to feel the foreign substances particularly in use for a diaper or the like which uses a highly concentrated water absorbent resin, so that this may result in complaints from consumers. Thus, the product cannot be shipped and are scrapped as "out of speck", which results in lower yields and higher costs.

However, each of the techniques described in Patent Documents 1 to 5 is not to remove the foreign matters which may be slightly included, so that the resultant water absorbent resin has the uncomfortable appearance caused by the foreign matters. This raises such a problem that the resultant water absorbent resin is not satisfactory in view of the whiteness. That is, conventional arts are not to directed to any problem or any finding regarding higher whiteness realized by removing the foreign matters so that the water absorbent resin is free from any uncomfortable appearance.

Further, the technique of Patent Document 6 was used for removal of the metallic foreign substances by the inventors of the present invention, but they found it impossible to remove the foreign matters even though the technique of Patent Document 6 is repeatedly used. Further, the foreign substances removed by the technique of Patent Document 6 are metallic foreign substances derived from a manufactory, so that the metallic foreign substances have no visually uncomfortable appearance as stainless. Furthermore, each of the techniques described in Patent Documents 7 and is 8 exhibits substantially no effect in reduction of coloring and reduction of color foreign substances.

As other means for removing the foreign matters, not only such operation that the foreign matters are regularly monitored so as to be removed, but also the following operations can be adopted: i.e., improvement of a piston flow of a water absorbent resin production apparatus; frequent cleaning carried out at the time of stoppage of a production line; prevention of agglomeration at the time of surface cross-linking so that adhesion of agglomerates onto an internal portion of the production apparatus is prevented; prevention of dew condensation in the production apparatus (prevention of moisture evaporation from the water absorbent resin being heated); and the like. However, each of the operations is extremely troublesome, which results in less efficient production. That is, there is such a conventional problem that the conventional art is less efficient and takes higher cost in producing and shipping a water absorbent resin having substantially no foreign matters.

It was found that: an amount (the number of particles) of the foreign matters is generally so small as zero (not more than the detection limit) or so small as to be unnoticeable, but continuous production carried out for an extended period of time causes the amount to increase, particularly at the time of production trouble, a greater amount of the foreign matters temporarily occurs. Thus, there is not known a method for removal of the foreign matters from the water absorbent resin which removal has not been cared about.

The present invention was made in view of the foregoing problems, and an object of the present invention is to provide (i) a water absorbent resin powder production method in which a color sorting technique is used to remove the foreign matters and (ii) a package of water absorbent resin powder which has less foreign matters and has high properties.

The inventors of the present invention diligently studied in view of the foregoing problems. As a result, they found that there are foreign matters which cannot be removed by repeating the technique described in Patent Document 4, and cut off and analyzed the foreign matters. As a result, they found that the foreign matters are burned portions of the water absorbent resin. They found that the foreign matters which are organic substances cannot be removed by the technique (iron remover using a magnetic line) described in Patent Document 4. Further, according to the analysis, the foreign matters were free from any problem in view of the property and the safety but a large amount of the foreign matters was found in a water absorbent resin whose properties are controlled in accordance with various parameters (hereinafter, the water absorbent resin are referred to as "high property water absorbent resin"). Particularly in a high property water absorbent resin produced by carrying out a surface cross-linking treatment at a high temperature and continuously carrying out the steps, a large amount of the foreign matters was found.

While, a smaller amount of the foreign matters was found in a water absorbent resin subjected to a low-temperature surface treatment, a water absorbent resin whose surface has not been treated, and a water absorbent resin obtained by reverse phase suspension polymerization. Further, a large amount of the foreign matters was found in continuous production, in switching products, in changing a production condition, and in restarting the production.

The high property water absorbent resin has a high commercial value due to its high water absorbing performance, so that it is so necessary to reduce an influence the foreign matters have on appearance of the product in preventing the commercial value from decreasing. However, the production cost of the high property water absorbent resin is likely to increase, so that the conventional technique for producing and shipping the water absorbent resin having substantially no foreign matters results in higher cost and less efficient production.

As a result of further study, the inventors of the present invention found it possible to efficiently remove the foreign matters by adopting the color sorting technique in the production steps after the drying step, thereby completing the present invention.

That is, a method according to the present invention for producing water absorbent resin powder whose mass average particle diameter defined by sieve classification is 300 µm or more and 10 mm or less and which contains less than 10% by mass of fine powder having a particle diameter of 150 µm or less and has a surface cross-linked structure, said method being characterized by comprising: a polymerization step in which an unsaturated monomer aqueous solution is polymerized; a drying step in which a hydrogel cross-linked polymer obtained in the polymerization step is dried; a surface treatment step in which the hydrogel cross-linked polymer or a dried hydrogel cross-linked polymer is subjected to a surface treatment; and a sorting step, carried out after the drying step, in which a foreign matter included in a water absorbent resin is color-sorted from the water absorbent resin entirely or partially.

According to the arrangement, as to the high property water absorbent resin in which foreign matters are likely to occur, a color of a favorable water absorbent resin is regarded as a background color, and a color of the foreign matters is compared with the background color, thereby removing the foreign matters. Thus, it is not necessary to carry out a troublesome operation for removing foreign matters, e.g., it is not necessary to carry out an operation in which a production line is stopped and cleaned, so that it is possible to more efficiently produce the water absorbent resin powder. Also, it is possible to stably and efficiently obtain, in a continuous manner, a water absorbent resin whose appearance is free from any uncomfortable appearance and which has high properties, excellent whiteness, and is less likely to be colored, for an extended period of time.

It is preferable to arrange the method according to the present invention for producing water absorbent resin powder so that an air jet is emitted so as to color-sort the foreign matter. According to the arrangement, an air jet is emitted to particles determined as foreign matters as a result of the color sorting. Thus, it is possible to efficiently remove from the production line or after the production in a pinpoint manner.

It is preferable to arrange the method according to the present invention for producing water absorbent resin powder so that a digital image process is carried out so as to color-sort the foreign matter. According to the arrangement, it is possible to narrow an area detected by the sensor, so that it is possible to more exclusively detect the foreign matters. Thus, it is possible to decrease a ratio of favorable parts removed together with the foreign matters.

It is preferable to arrange the method according to the present invention for producing water absorbent resin powder so that the drying step and the surface treatment step are carried out by heating the hydrogel cross-linked polymer or the dried hydrogel cross-linked polymer at 150° C. or higher and 250° C. or lower. According to the arrangement, the drying and the surface cross-linking are carried out at high temperature, so that the surface cross-linking is firmly carried out, thereby obtaining a water absorbent resin having higher water absorbing performance and extremely high properties. Thus, it is possible to enhance the whiteness of the water absorbent resin, having extremely high properties, which is subjected to the color sorting.

It is preferable to arrange the method according to the present invention for producing water absorbent resin powder so as to further comprise a continuous transport step, carried out after the drying step, which links a pulverization step, a classification step, and production steps, wherein production is continuously carried out for 30 days or more and 1000 days or less. It was found that the foreign matters are burned portions of the water absorbent resin and this results from such condition that the water absorbent resin remains in the production line and is burned. Thus, a large amount of the foreign matters is found in the production line having continuous steps, i.e., the production line including, after the drying step, a pulverization step, a classification step, and a continuous transport step which links respective production steps.

Further, a large amount of the foreign matters is found in carrying out continuous production, switching a product, changing a production condition, and restarting the operation. Thus, according to the arrangement, the color sorting is carried out in the production line including the continuous steps, so that it is possible to efficiently remove the foreign matters without stopping the continuous steps for a purpose of cleaning and the like, thereby greatly reducing the cost and producing the water absorbent resin powder more efficiently.

It is preferable to arrange the method according to the present invention for producing water absorbent resin powder so that 20 Kg to 200000 Kg of the water absorbent resin is packaged into each non-permeable bag or each non-permeable container and the sorting step is carried out right before or right after packaging a final product. As described above, a large amount of the foreign matters is found in the surface cross-linked product, so that it is possible to efficiently remove the foreign matters by carrying out the sorting step right before or right after packaging a final product.

It is preferable to arrange the method according to the present invention for producing water absorbent resin powder so that the water absorbent resin subjected to the color sorting is water absorbent resin powder obtained by carrying out cross-linking polymerization with respect to an unsaturated monomer containing acrylic acid and/or salt thereof as a main component, and the water absorbent resin satisfies the following properties:

(a) an absorbency against pressure (AAP: 0.90 g) is 20 g/g or more and 60 g/g or less;
(b) an amount of fine powder whose particle diameter is 150 μm or less is 0 mass % or more and 5 mass % or less, and a mass average particle diameter (D50) is 300 μm or more and 600 μm or less, and a particle size distribution logarithmic standard deviation (σζ) is 0.20 or more and 0.40 or less, defined by standard sieve classification, where the absorbency against pressure (AAP: 0.90 g) represents an absorbency of 0.9 g of a particulate water absorbing agent for 0.90 mass % sodium chloride aqueous solution under a pressure of 4.8 kPa for 60 minutes.

According to the arrangement, the absorbency against pressure (AAP: 0.90 g) is extremely high, so that the resultant water absorbent resin powder stably exhibits high properties regardless of an amount of the water absorbent resin (concentration) in a diaper, and its permeability is high. Further, its particle size is adjusted to a specific particle size (b), so that properties in surface cross-linking is improved.

It is preferable to arrange the method according to the present invention for producing water absorbent resin powder so that the color sorting is repeated plural times. It is possible to improve the yield by sorting particularly a water absorbent resin having been sorted and containing the sorted foreign matters.

It is preferable to arrange the method according to the present invention for producing water absorbent resin powder so that aqueous solution polymerization, particularly, continuous aqueous solution polymerization, further continuous belt polymerization or continuous kneader polymerization is carried out as the polymerization. According to the arrangement, it is possible to highly productively obtain a water absorbent resin having high properties.

A package according to the present invention for packaging water absorbent resin powder obtained by carrying out cross-linking polymerization with respect to an unsaturated monomer containing acrylic acid and/or salt thereof as a main component, said package comprising a non-permeable bag or a non-permeable container containing 20 kg to 200000 kg of the water absorbent resin powder as each package, a production volume of the package being 100 Mton or more, said water absorbent resin powder satisfying the following properties:

(a) an amount of a foreign matter included in the water absorbent resin powder is 5 mm$^2$/100 g or less;
(b) an absorbency against pressure (AAP: 0.90 g) is 20 g/g or more and 60 g/g or less;
(b) an amount of fine powder whose particle diameter is 150 μm or less is 0 mass % or more and 5 mass % or less, and a mass average particle diameter (D50) is 200 μm or more and 550 μm or less, and a particle size distribution logarithmic standard deviation (σζ) is 0.20 or more and 0.40 or less, defined by standard sieve classification, where the absorbency against pressure (AAP: 0.90 g) represents an absorbency of 0.9 g of a particulate water absorbing agent for 0.90 mass % sodium chloride aqueous solution under a pressure of 4.8 kPa for 60 minutes.

According to the arrangement, it is possible to provide a water absorbent resin which is suitable for mass consumption and has less foreign matters, and it is possible to exhibit high properties in a diaper and it is possible to prevent any uncomfortable appearance derived from the foreign matters.

Further, the resultant water absorbent resin powder has an extremely small amount of foreign matters as indicated by the property (a). That is, a small amount of black or brown particles is contained, so that the whiteness is extremely high. Thus, it is possible to provide a high quality particulate water absorbing agent which is excellent in both appearance and performance. Further, according to the arrangement, it is possible to continuously produce the high property water absorbent resin without raising the problem of the foreign matters, and it is possible to produce a water absorbent resin which is favorable in view of (i) balance with properties and (ii) cost performance.

For a fuller understanding of the nature and advantages of the invention, reference should be made to the ensuing detailed description taken in conjunction with the accompanying drawings.

BRIEF DESCRIPTION OF DRAWING

FIG. 1 is a diagram schematically illustrating an arrangement of a color sorting apparatus 1 used as an example of the present embodiment.

REFERENCE NUMERALS

1 Color sorting apparatus
11 Feeder
12 Chute
13 Sorting room
14 Sensor
15 Lamp
16 Reflector
17 Air gun
18 Nondefective product collecting cylinder
19 Defective product collecting cylinder
100 Water absorbent resin

BEST MODE FOR CARRYING OUT THE INVENTION

One embodiment of the present invention is described below. However, the present invention is not limited to this.
(1. Water Absorbent Resin Powder Production Method)

In one embodiment, a method according to the present invention for producing water absorbent resin powder having a surface cross-linked structure includes: a polymerization step; a drying step; a surface treatment step; and a sorting step, serving as a production step carried out after the drying step, in which foreign matters contained in a water absorbent resin are subjected to color sorting. A particle size of the water absorbent resin before or after the color sorting is preferably such that a mass average particle diameter is 300 μm or more and 10 mm or less and an amount of fine powder whose particle diameter is 150 μm or less is less than 10 mass %.

Note that, the water absorbent resin of the present invention generally refers to a water-insoluble and water-swelling polymer gelatinizing agent whose centrifugal retention capacity (CRC) is 10 g/g or more and which contains 50% or less of a water-soluble polymer as a water-soluble component. Further, the water absorbent resin powder of the present invention refers to powder obtained by pulverizing, as necessary, a dried hydrogel cross-linked polymer (water absorbent resin) into a powdery form. The water absorbent resin powder produced by the method according to the present invention for producing water absorbent resin powder is such that its average weight particle diameter is 300 μm or more and 10 mm or less and an amount of fine powder whose particle diameter is 150 μm or less is less than 10 mass %.

<Polymerization Step>

First, the polymerization step is described as follows. The polymerization step is a step of polymerizing aqueous solution of an unsaturated monomer so as to generate a hydrogel cross-linked polymer.

As the polymerization of the present invention, it is preferable to carry out reverse phase suspension polymerization or aqueous solution polymerization, particularly continuous aqueous solution polymerization such as aqueous solution polymerization, continuous belt polymerization, and continuous kneader polymerization, in view of properties and in view of prevention of occurrence of foreign matters. Note that, the reverse phase polymerization is a polymerization method in which a monomer aqueous solution is suspended in a hydrophobic organic solvent. For example, the polymerization method is described in U.S. Pat. No. 4,093,776, U.S. Pat. No. 4,367,323, U.S. Pat. No. 4,446,261, U.S. Pat. No. 4,683,274, U.S. Pat. No. 5,180,798, U.S. Pat. No. 5,244,735, and the like.

The aqueous solution polymerization is a method in which a monomer aqueous solution is polymerized without using any dispersion solvent. For example, the polymerization method is described in U.S. Pat. No. 4,625,001, U.S. Pat. No. 4,873,299, U.S. Pat. No. 4,286,082, U.S. Pat. No. 4,973,632, U.S. Pat. No. 4,985,518, U.S. Pat. No. 5,124,416, U.S. Pat. No. 5,250,640, U.S. Pat. No. 5,264,495, U.S. Pat. No. 5,145,906, U.S. Pat. No. 5,380,808, U.S. Pat. No. 6,174,978, U.S. Pat. No. 6,241,928, U.S. Pat. No. 6,987,151, U.S. Pat. No. 6,710,141, U.S. Pat. No. 6,867,269, U.S. Pat. No. 6,906,159, U.S. Pat. No. 7,091,253, U.S. Patent Publication No. 2005-0215734, U.S. Patent Publication No. 2006-0167198, and the like, European Patent No. 0811636, European Patent No. 0955086, European Patent No. 0922717, and the like. A monomer, a cross-linking agent, a polymerization initiator, and other additive that are described in these documents are applicable to the present invention.

According to the aqueous solution polymerization, the continuous belt polymerization (U.S. Pat. No. 4,857,610, U.S. Patent Publication No. 2005-0215734 and U.S. Patent Publication No. 2006-0167198 for example), and the continuous kneader polymerization (U.S. Pat. No. 6,987,151 and U.S. Pat. No. 6,710,141 for example), it is not necessary to add any organic solvent, so that each of these polymerization methods has less influence on the environment than the reverse phase suspension polymerization and is excellent in safety, and it is possible to carry out the polymerization and the drying at a high temperature. Thus, productivity and property thereof are excellent, but foreign matters derived from a high temperature are likely to occur. Thus, the present invention can be favorably applied.

The unsaturated monomer is a water-soluble monomer. Specific examples thereof includes: acid group monomers such as (meth)acrylic acid, β-acryloyl oxypropionic acid, maleic acid, maleic anhydride, fumaric acid, crotonic acid, itaconic acid, cinnamic acid, 2-(meth)acryloylethane sulfonic acid, 2-(meth)acryloylpropane sulfonic acid, 2-(meth)acrylamide-2-methylpropane sulfonic acid, vinyl sulfonic acid, stylene sulfonic acid, allyl sulfonic acid, vinyl phosphonic acid, 2-(meth)acryloyloxyethyl phosphoric acid, and (meth)acryloxyalkane sulfonic acid; alkali metal salt and alkali earth metal salt thereof, ammonium salt, and alkylamine salt; dialkylamino alkyl(meth)acrylates such as N,N-dimethylaminoethyl(meth)acrylate, N,N-dimethylaminopropyl(meth)acrylate, and N,N-dimethylaminopropyl(meth)acrylamide, and quaternaries thereof (e.g., a reactant obtained by reaction with alkylhalide, a reactant obtained by reaction with dialkylsulfate, and the like); dialkylaminohydroxyalkyl(meth)acrylates and quaternaries thereof; N-alkylvinylpyridinium halide; hydroxymethyl(meth)acrylate such as hydroxymethyl (meth)acrylate, 2-hydroxyethyl methacrylate, and 2-hydroxypropyl(meth)acrylate; acrylamide, methacrylamide, N-ethyl(meth)acrylamide, N-n-propyl (meth)acrylamide, N-isopropyl(meth)acrylamide, and N,N-dimethyl (meth)acrylamide; alkoxypolyethyleneglycol (meth)acrylate such as methoxypqlyethyleneglycol (meth) acrylate, polyethyleneglycol mono(meth)acrylate; vinylpyridine, N-vinylpyridine, N-vinylpyrrolidone, N-acryloylpiperidine; N-vinylacetamide; and the like. These unsaturated monomers may be used independently or in a suitable combination of two or more kinds.

Among the above-exemplified water-soluble unsaturated monomers (excluding the cross-linking agent), it is preferable to use a monomer containing as a main component the acrylate monomer (50 mol % or more, preferably 70 to 100 mol %, more preferably 90 to 100 mol % with respect to the entire monomer) since the water absorbing performance and the safety of the resultant hydrogel. Note that, the "water-soluble" means a state in which 1 g or more, preferably 10 g or more of a monomer dissolves in 100 g of water at a room temperature (normal temperature and normal pressure).

Herein, the acrylate salt monomer refers to acrylic acid and/or acrylic acid water-soluble salts. Further, the acrylic acid water-soluble salts are acrylic acid alkali metal salt, acrylic acid alkali earth metal salt, acrylic acid ammonium salt, acrylic acid hydroxy ammonium salt, acrylic acid amine salt, and acrylic acid alkylamine salt, whose neutralization rate is 30 mol % or more and 10 mol % or less, preferably 50 mol % or more and 99 mol % or less.

Among the above-exemplified water-soluble salts, monovalent salt, particularly preferably, sodium salt and potassium salt. These acrylate salt monomers may be used independently or in a suitable combination of two or more kinds. Note that, an average molecular weight (polymerization degree) of the water absorbent resin is not particularly limited.

In the polymerization step, a monomer composition containing the unsaturated monomer as a main component is polymerized preferably in the presence of a minute amount of the cross-linking agent, thereby obtaining the aforementioned hydrogel cross-linked polymer. The hydrogel cross-linked polymer may be a self-cross-linking type obtained without using the cross-linking agent, but it is preferable to copolymerize or react a cross-linking agent having two or more polymerizable unsaturated groups in its molecule or two or more reaction groups in its molecule.

Further, the monomer composition may include other hydrophobic unsaturated monomer which is copolymerizable with the aforementioned unsaturated monomer as long as hydrophilicity of the resultant hydrogel cross-linked polymer is not inhibited. Specific examples of the copolymerizable monomer include: (meth)acrylic acid esters such as methyl (meth)acrylate, ethyl(meth)acrylate, and butyl (meth)acrylate; a hydrophobic monomer, having no acid group, no hydroxyl group, and no amino group, e.g., vinyl acetate and vinyl propionate; and the like. These copolymerizable monomers may be used independently or in a suitable combination of two or more kinds.

Further, examples of the cross-linking agent (referred to also as "internal cross-linking agent) include: a compound having a plurality of vinyl groups in its molecule; a compound having a plurality of functional groups, reactable with a carboxyl group and a sulfonic acid group, in its molecule; a compound having a vinyl group and a functional group, reactable with a carboxyl group and a sulfonic acid group, in its molecule; and the like. These cross-linking agents may be used in independently or in a suitable combination of two or more kinds. It is preferable to use at least a compound having a plurality of vinyl groups in its molecule.

Specific examples of the compound having a plurality of vinyl groups in its molecule include: N,N'-methylenebis (meth)acrylamide, (poly)ethyleneglycol di(meth)acrylate, (poly)propyleneglycol di(meth)acrylate, (ethyleneoxide denatured) trimethylolpropanetri(meth)acrylate, trimethylolpropanedi(meth)acrylate, glycerin etri(meth)acrylate, (ethyleneoxide denatured) glycerineacrylatemethacrylate, pentaerythritoltetra(meth)acrylate, dipentaerythritolhexa(meth)acrylate, N,N-diallylacrylamide, triallyl cyanurate, triallyl isocyanurate, triallyl phosphate, triallyl amine, diallyloxy acetate, bis(N-vinylcarboxilate amide), (ethyleneoxide denatured) tetraallyloxiethane, and the like.

Further, as the compound having a plurality of functional groups reactive with a carboxyl group and a sulfonic acid group in its molecule, it is possible to use below-exemplified surface cross-linking agents (polyhydric alcohol, polyhydric glycidyl compound, polyhydric amine compound, alkylenecarbonate compound, polyhydric metal salt, and the like) as an internal cross-linking agent at the time of polymerization.

An amount of the cross-linking agent to be used is not particularly limited, but the amount is preferably 0.0001 mol % or more and 10 mol % or less, more preferably 0.001 mol % or more and 1 mol % or less, still more preferably 0.01 mol % or more and 0.5 mol % or less, with respect to the aforementioned monomer components. In the present invention, a method for polymerizing the monomer components is not particularly limited, but examples thereof include: aqueous solution polymerization; still polymerization carried out on a tray or a belt; polymerization carried out in a kneader; and the like.

Further, in carrying out the aqueous solution polymerization with respect to the unsaturated monomer, either continuous polymerization or batch polymerization may be adopted. Also, the polymerization may be carried out at any one of a normal pressure, a reduced pressure, and an increased pressure. Note that, it is preferable to carry out the polymerization reaction in an air current of inert gas such as nitrogen, helium, argon, and carbon dioxide.

In initiating the polymerization of the polymerization reaction, it is possible to use a polymerization initiator or an activation energy ray such as a radiation ray, an electron ray, an ultraviolet ray, and an electromagnetic ray. The polymerization initiator is not particularly limited, but it is possible to use a thermal decomposition initiator or a photodecomposition initiator. Examples of the thermal decomposition initiator include: persulfate such as sodium persulfate, potassium persulfate, and ammonium persulfate; peroxide such as hydrogen peroxide, t-butylperoxide, and methylethylketoneperoxide; azo compound such as azonitryl compound, azoamidine compound, cyclic azoamidine compound, azoamide compound, alkylazo compound, 2,2'-azobis(2-amidinopropane)dihydrochloride, and 2,2'-azobis[2-(2-imidazoline-2-yl)propane]dihydrochloride]. Examples of the photodecomposition initiator include: benzoin derivative, benzyl derivative, acetophenone derivative, benzophenone derivative, and azo compound. These polymerization initiators may be used independently or in a suitable combination thereof. Further, in case of using peroxide as the polymerization initiator, for example, a reducer such as sulfite salt, bisulfite, and L-ascorbic acid may be used together so as to carry out oxidation reduction (redox) polymerization.

An amount of the polymerization initiator to be used is not particularly limited, but the amount preferably ranges from 0.0001 to 1 mol %, more preferably from 0.01 to 0.5 mol %, still more preferably from 0.03 to 0.3 mol % with respect to the monomer components in view of the property and the productivity.

In polymerizing the monomer components in the presence of the cross-linking agent, it is preferable to use water as solvent. That is, it is preferable to use the monomer components and the cross-linking agent in a form of aqueous solution. This improves the water absorbing performance of the resultant water absorbent resin.

A concentration of the monomer components in the aqueous solution (hereinafter, referred to as "monomer aqueous solution") is preferably 20 wt % or more and 75 wt % or less, more preferably 25 wt % or more and 65 wt % or less. In case where the concentration of the monomer components is less than 20 wt %, a water extractable polymer content of the resultant water absorbent resin may increase. Also, in this case, foam is not sufficiently generated by a foaming agent and polymerization heat (boiling caused by the polymerization heat), so that it may be impossible to improve an absorption rate. While, in case where the concentration of the monomer components exceeds 75 wt %, it may be difficult to control foam generated by the reaction temperature and the foaming agent. Note that, the aqueous solution of the present invention means also dispersion liquid whose concentration exceeds the saturated concentration, but it is preferable that the polymerization is carried out with the concentration below the saturated concentration. The saturated concentration is suitably determined by a kind of the monomer and a temperature of the aqueous solution.

Further, an organic solvent may be used together as a solvent for the monomer aqueous solution so that the monomer aqueous solution has a foaming function, and water and a water-soluble or dispersive organic solvent may be used together. It is preferable that an amount of water in the solvent preferably ranges from 90 to 100 wt %, particularly preferably from 99 to 100 wt %. The polymerization temperature can be set in a range from 20 to 130° C., more preferably from 30 to 120° C.

In a method according to the present invention for producing a water absorbent resin, the unsaturated monomer may be made into particulate hydrogel by carrying out kneader polymerization or reverse phase suspension polymerization at the time of polymerization. However, in case of carrying out still polymerization (stirless polymerization) such as belt polymerization, the method may additionally include a gel granulation step in which a clumpy hydrogel obtained in the polymerization step is crushed into particulate hydrogel. The hydrogel is crushed into particulate hydrogel in this manner, so that a surface area of the gel increases. As a result, the below-described drying step can be smoothly carried out. The hydrogel can be crushed by various cutting means such as a roller cutter, a guillotine cutter, a slicer, a roll cutter, a shredder, scissors, or by a combination thereof, and the cutting means is not particularly limited.

<Drying Step>

Next, the drying step is described as follows. The drying step is a step: of drying the hydrogel cross-linked polymer obtained in the polymerization step, preferably, the particulate hydrogel obtained by crushing the hydrogel in the gel granulation step. The drying method is not particularly limited. For example, it is possible to favorably use a conventional method using one of or two or more devices out of a band dryer, a stirring dryer, and a fluidized-bed dryer.

A temperature at which the hydrogel cross-linked polymer is dried is not particularly limited, but the drying temperature generally ranges' from 70 to 250° C., preferably 150° C. or higher and 230° C. or lower, more preferably 160° C. or higher and 180° C. or lower. Note that, the drying temperature is defined by a heat medium temperature in case where a heat medium is used in the aforementioned dryer. In case where the drying temperature cannot be defined by the heat medium temperature as in a case of a microwave for example, the drying temperature is defined by a temperature of the hydrogel cross-linked polymer. In case of carrying out high temperature drying (particularly at 250° C. or higher), the absorbency may decrease. In case where the drying temperature exceeds 250° C., the resin deteriorates. In the present invention, the hydrogel is dried preferably in the aforementioned temperature range so as to improve the absorbency and provide a water absorbent resin having less foreign matters.

In order to realize excellent property and maximize the effect of the present invention, a moisture content (defined by a loss from 1 g of a resin having been dried in an airless oven at 180° C. for three hours) of the dried polymer is preferably 90 mass % or more, more preferably 93 mass % or more and 99.9 mass % or less, particularly preferably 95 mass % or more and 99.8 mass % or less.

The hydrogel cross-linked polymer having been subjected to the drying step is processed into a particulate form by carrying out a below-described pulverizing step and a below-described classification step as necessary. Note that, a particle size of thus obtained particles may be controlled (sizing may be carried out) by granulation or by adding fine particles (e.g., fine particles whose particle diameter is not more than 150 μm) having been removed in the classification step.

Note that, in the production method according to the present invention, the polymerization step and the drying step may be carried out in a batch manner or in a continuous manner. It is preferable to adopt continuous production including a transport step which links respective production steps. The continuous production will be detailed later.

<Properties of Water Absorbent Resin Powder>

The water absorbent resin powder produced by the water absorbent resin powder production method according to the present invention is such that a mass average particle diameter defined by sieve classification is preferably 200 μm or more and 10 mm or less, more preferably 300 μm or more and 10 mm or less, (still more preferably 600 μm or less), and an amount of fine powder whose particle diameter is 150 μm is less than 10 mass %, and has a surface cross-linked structure. That is, the water absorbent resin powder has less fine powder and is made up of fine particles whose particle size is even, and has high water absorbing performance. As described above, such high property water absorbent resin powder is likely to contain foreign matters, so that removal of the foreign matters through the below-described sorting step allows production of water absorbent resin powder whose properties and whiteness are high and which is less likely to be colored. Thus, such a removal technique is very useful.

Further, the present invention using the color sorting technique can be favorably adopted to a polyhedral water absorbent resin (its mass average particle diameter ranges from 2 to 10 mm and it is a tetrahedral to dodecahedral (preferably hexahedral) water absorbent resin) described in U.S. Patent Publication No. 2007-041796. By adopting the present invention to the polyhedral water absorbent resin, it is possible to obtain water absorbent resin powder whose design is favorable and which is suitable for display.

Note that, in the present specification, "mass" is a synonymous of "weight" and "mass %" is a synonymous of "weight %". In view of the properties, it is necessary that the mass average particle diameter (defined by sieve classification) of the water absorbent resin powder is 200 g/m or more and 10 mm or less, more preferably 300 μm or more and 10 mm or less (still more preferably 600 μm or less), but the mass average particle diameter is preferably 350 μm or more and 550 μm or less, more preferably 400 μm or more and 500 μm or less.

Further, in order to exhibit effect in actual use for a diaper or the like, a logarithmic standard deviation (σζ) of particle size distribution preferably ranges from 0.10 to 0.45, more preferably from 0.20 to 0.40, still more preferably from 0.27 to 0.37, particularly preferably from 0.28 to 0.35.

It is necessary that an amount of fine powder whose particle diameter is not more than 150 μm is 0 mass % or more and less than 10 mass %, but the amount is preferably 0 mass % or more and less than 5 mass %, more preferably 0 mass % or more and less than 3 mass %, still more preferably 0 mass % or more and less than 1 mass %. These particle diameters and these amounts allow the water absorbent resin powder to exhibit high water absorbing performance. The fine powder decreases the performance of the water absorbent resin and cannot be used as the water absorbent resin, so that the fine powder decreases the yield of the water absorbent resin production. Thus, it is more preferable that a smaller amount of the fine powder is included.

A shape of each particle of the water absorbent resin powder may be any one of a spherical shape, a cubic shape, a rectangular shape, a pillar shape, a plate shape, a scaly shape, a rod shape, a needle-like shape, a fibrous shape, and the like. It is particularly preferable that the water absorbent resin powder is made up of polyhedral particles or indefinite-shape pulverized particles obtained in the pulverization step carried out after the drying step. Further, the particles may be granulated particles or may be primary particles (non-granulated particles).

As long as the water absorbent resin powder obtained by the production method of the present invention, it is possible to achieve such a high absorbing performance that, for example, a centrifugal retention capacity (CRC) is 10 g/g or more, preferably 25 g/g or more, more preferably 28 g/g or more, still more preferably 31 g/g or more, particularly preferably 34 g/g or more, and an absorbency against pressure (AAP) (4.9 kPa) is preferably 20 g/g or more, more preferably 23 g/g or more, still more preferably 25 g/g or more, and it is possible to keep the high absorbing performance for an extended period of time. Note that, upper limits of the centrifugal retention capacity (CRC) and the absorbency against pressure (AAP) are not particularly limited. In view of a balance between other properties and the production cost, 80 g/g or less, further, 60 g/g or less is sufficient as each of the upper limits.

The water absorbent resin powder obtained by the production method of the present invention has the excellent water absorbing performance, and deterioration of the excellent water absorbing performance is suppressed and is kept for an extended period of time, and the water absorbent resin powder has less foreign matters and has high whiteness. Thus, the water absorbent resin powder can be favorably used as a sanitary material though the use of the water absorbent resin powder is not limited thereto. According to the present invention, it is possible to easily produce the water absorbent resin powder having below-described excellent absorbing properties, so that the water absorbent resin powder is widely used in an agriculture/horticulture water retaining agent, an industrial water retaining agent, a moisture absorbing agent, a dehumidification agent, a display, an aromatic agent, a deodorant, a building material, and the like. Above all, the water absorbent resin powder is favorably used particularly in a sanitary material for absorbing feces, urine, and blood, e.g., in a sanitary napkin and the like.

<Sorting Step>

Next, the sorting step is described as follows. The sorting step is a production step following to the drying step and is to carry out color sorting with respect to entire parts or a part of the water absorbent resin so as to sort foreign matters included in the water absorbent resin. Note that, the color sorting of the present invention is such that colors of foreign substances (dark colors such as black, brown, and dark brown) are sorted and removed from a color of the water absorbent resin (white in general). The color of the water absorbent resin subjected to the sorting step is not limited to complete white and may be colored otherwise by any dye. Further, a part of the water absorbent resin may be yellowed due to its material. For example, YI (Yellow Index) of the water absorbent resin subjected to the sorting step is preferably 70 or more, more preferably 80 or more, particularly preferably 90 or more. Note that, the "YI" is defined in U.S. Pat. No. 6,444,744 for example.

Further, it is preferable that values indicative of properties (solid content (moisture content), CRC, AAP, particle size, and the like) of the water absorbent resin subjected to the sorting step are in the value ranges described in (Properties of water absorbent resin), or in value ranges described in below (2. Particulate water absorbing agent). Further, the water absorbent resin subjected to the sorting step may include additives described in the specification. Further, the particle size of the water absorbent resin may be the same or may be changed before and after the sorting step.

As to the foreign matters to be removed, each particle thereof may be entirely colored or may be partially colored. In this manner, the foreign matters are sorted by setting a sorting condition suitably. The production method according to the present invention is most favorably used to remove dark color foreign matters included in white particles.

The foreign matters cannot be removed by repeating the process in the technique of Patent Document 6 in which metallic foreign substances included in the water absorbent resin are removed by a magnetic line. The inventors of the present invention studied the cause thereof. As a result, they found that the foreign matters are the water absorbent resin's parts burned in the production step. It was found that: parts of the water absorbent resin which adhere to a production device remain in the device heated for a long time, and then the parts are discharged from the device together with the water absorbent resin, so that the parts are mixed in the water absorbent resin as the foreign matters. However, the water absorbent resin is nonmagnetic, so that the foreign matters derived from the water absorbent resin can not be removed by the technique of Patent Document 6 which adopts the magnetic line. Thus, the inventors of the present invention focused on the color sorting as the means for removing the foreign matters.

In the color sorting, a sample color (bright) of a nondefective product is regarded as a background, and a color of a sample and the background color are compared with each other by a sensor, and a signal at the time when the sensor monitors the background is set as a standard and a certain range is determined, and a signal deviating from the range is regarded as indicating a color difference, thereby removing defective products regarded as having a different color. The color sorting is frequently used in a foreign substance removing step carried out with respect to grains, beans, and the like. Examples thereof are exclusion of defective products, removal of sands and pebbles, and the like.

Conventionally, as described in Patent Documents 1 to 5, entire particles have been focused on and a method for preventing browning or yellowing of the entire particles has been adopted, but it has not been recognized that the uncomfortable appearance in observing a water absorbent resin is caused by foreign matters, so that there was no finding on the method for removing the foreign matters. Thus, the optimal method has not been found. Also, it was found that: even if the conventional color indexes (YI value, Lab value) have favorable values, the indexes in some cases are not necessarily parameters suitable for a visual sense in an actual use. The inventors of the present invention found that the uncomfortable appearance is caused by the foreign matters (presence of several colored particles). As a result of diligent study, they found that the foreign matters are black or brown, so that they focused on the color sorting, thereby succeeding in efficient removal of the foreign matters.

The color sorting is such that a sensor determines whether there is any coloring or not as described above, and the color sorting does not require a step of adding other component such as a chelating agent, an acid component, and the like unlike the technique described in Patent Documents 1 to 5 for preventing the coloring. Thus, it is possible to carry out the color sorting continuously with other steps, so that it is possible to efficiently remove the foreign matters in an extremely simple manner.

Next, with reference to FIG. 1, the sorting step is detailed as follows. FIG. 1 is a diagram schematically illustrating an arrangement of a color sorting apparatus 1 used as an example of the present embodiment. The color sorting apparatus 1 is not particularly limited, and a conventionally known apparatus can be used as the color sorting apparatus 1. Examples of the color sorting apparatus 1 are Kubota particulate foreign substance sorter PLATON (produced by Kubota Corporation), Magic Sorter (produced by SATAKE CORPORATION), Scanmaster (produced by SATAKE CORPORATION), and the like.

As illustrated in FIG. 1, the color sorting apparatus 1 includes a feeder 11, a chute 12, a sorting room 13, a sensor 14, a lamp 15, a reflector 16, an air gun 17, a nondefective product collection cylinder 18, and a defective product collection cylinder 19. The number of chute(s) 12 can be set to one or more, preferably two to 100, depending on a scale. Further, it is preferable to provide a dust collector so as to reduce dusts from the water absorbent resin.

The feeder 11 stores therein a water absorbent resin 100 having been subjected to the drying step and supplies the water absorbent resin 100 to the chute 12 while controlling an amount of the water absorbent resin 100 flowed to the chute 12. A type of the feeder 11 is not particularly limited, and it is possible to use an electromagnetic feeder, a vibration feeder, a belt conveyer, and the like for example. The chute 12 evenly flows, in a flat manner, the water absorbent resin 100 supplied from the feeder 11. In view of improvement in the sorting efficiency, the water absorbent resin 100 is supplied in a form of a single layer as much as possible.

The sorting room 13 includes the sensor 14 therein and serves as a portion which distinguishes the foreign matters from the flowing water absorbent resin 100. In the sorting room 13, the sensor 14, the lamp 15, and the reflector 16 are provided.

The sensor 14 senses the flowing water absorbent resin 100. The lamp 15 illuminates the inside of the sorting room 13 so that the sensor 14 more easily observes the water absorbent resin 100. The reflector 16 serves as a background of the water absorbent resin 100 to be sensed. The reflector 16 reflects a color (brightness) of a nondefective product, e.g., white (constant), and the sensor 14 compares a color of the water absorbent resin 100 entering the sorting room 13 with the color of the reflector 16. A signal at the time when the sensor 14 monitors the reflector 16 is regarded as a standard, and a certain range is determined, and a signal deviating from the range is determined to have a different color.

The sensor 14 is not particularly limited, and it is possible to use a conventionally known device such as a phototransistor, a solar battery, a camera, and the like. Examples of the camera include a line sensor camera, an area sensor camera, a CCD camera, an NIR camera, and the like. It is preferable to carry out a digital image process in the color sorting because a sensor detection area can be narrower than that of an analog signal process so that the foreign matters can be more exclusively detected. Thus, the CCD camera is particularly favorably used.

The camera may be a monochrome camera or may be a color camera. In case of the color camera, the nondefective product and the defective product are distinguished on the basis of a color difference. In case of the monochrome camera, in order to distinguish the nondefective product and the defective product, when brightness of the nondefective product and brightness of the defective product are hardly different from each other, a color filter is combined with the camera as required, thereby recognizing a color-difference as a brightness difference.

Note that, in the color sorting apparatus 1, whether or not to exclude the foreign matters may be determined in accordance with a size of the detected foreign matters. In this case, a lower limit of the number of pixels corresponding to the detected foreign substances which should be excluded is set in the camera. Further, sensitivity of the camera can be suitably set. Herein, the sensitivity refers to a margin in determining brightness unevenness of the sort target as a foreign substance. By adjusting the sensitivity, it is possible to control the accuracy and the yield.

The lamp 15 is not particularly limited, and it is possible to use a fluorescent lamp, a halogen lamp, a light emitting diode, and the like. The reflector 16 is suitably replaced as necessary so as to correspond to the color (brightness) of the water absorbent resin 100. If the brightness of the reflector 16 is equal to the brightness of the water absorbent resin 100, it is possible to obtain a most favorable sorting result. Generally, the color of the foreign matters is darker than the nondefective water absorbent resin, so that a white reflector is used.

A signal of the sensor 14 is amplified by an amplifier and is compared by a comparator, and the air gun 17 is driven by a power circuit. The air gun 17 emits an air jet to a falling defective product 102, determined as having a different color, so as to sort and remove the defective product 102. The defective product 102 jetted away by the air gun 17 is collected into the defective product collection cylinder 19, and a nondefective product 101 which was not jetted away by the air gun 17 is collected into the nondefective product collection cylinder 18. In the sorting step, the aforementioned operations are carried out at a high speed, so that it is possible to efficiently remove the foreign matters.

Further, the removal by sorting is not limited to the method using the air gun 17, and it is possible to adopt a method in which the falling defective product 102 is adsorbed, a method in which the defective product 102 is scraped with a scraper, and a similar method. Note that, the sorting step may be carried out twice or more in order to more accurately remove the foreign matters. As to the sorting step, in view of higher sorting efficiency, it is preferable to adopt a method using compressed air, e.g., the method using the air gun 17. The compressed air is preferably from 10 to 100000 Nl/min, more preferably from 100 to 10000 Nl/min.

By carrying out the sorting step after the drying step, it is possible to efficiently remove the foreign matters, so that it is possible to obtain a water absorbent resin, having a high properties, less foreign matters, and high whiteness, which is less likely to be colored. The sorting step is carried out at any timing as long as the sorting step is carried out after the drying step, so that the sorting step can be carried out at an arbitrary stage after the drying step. However, it is preferable to carry out the sorting step right before or right after packaging a final product, and it is particularly preferable to carry out the sorting step right before packaging the final product. The sorting step may be incorporated into the production step of the continuous production. That is, the sorting step may be carried out in line of the production step. Further, the sorting step may be carried out in a batch manner as required, apart from the production step.

Note that, a removal rate is suitably set depending on the yield, but it is difficult to selectively remove only the color particles at once, so that it is general that 0.01 to 10 mass %, preferably 0.5 to 7 mass %, more preferably 0.1 to 5 mass % of the water absorbent resin subjected to the sorting step is removed from the water absorbent resin subjected to the sorting step. Further, it may be so arranged that sorted particles including the foreign matters are further sorted so as to remove the foreign matters.

That is, it is preferable to carry out the color sorting plural times. Particularly, the water absorbent resin including the foreign matters which have been sorted once (first sorting) is further sorted (second sorting), thereby improving the yield. A ratio of the first sorting and the second sorting is suitably set so as to range from 10:0 (i.e., only the first sorting) to 5:5, preferably from 9:1 to 7:3.

For example, even if a ratio of the foreign matters to the entire particles is 0.1 weight % or less, generally, 0.01 weight % or less, further, 0.001 weight % or less, particularly 0.0001 weight % or less, it is difficult to selectively remove the foreign matters from the entire particles. Thus, after removing particles whose amount is 5% (particles whose amount is excessively larger than the amount of the foreign matters; particles which are substantially white and partially include foreign matters), the water absorbent resin particles which include the removed foreign matters and whose amount is 5% are subjected to the second sorting (5%×5%), as necessary, are further subjected to third sorting (5%×5% 5%), and to fourth sorting, thereby making the yield closer to 100%.

<Surface Treatment Step>

The surface treatment step is a step of carrying out a surface treatment with respect to the hydrogel cross-linked polymer or the dried polymer. In the present specification, the surface treatment refers to surface cross-linking and/or surface coating carried out with respect to the hydrogel cross-linked polymer or the dried polymer.

[Surface Cross-Linking]

In order to improve the water absorbing performance, it is preferable that the hydrogel cross-linked polymer is subjected to a surface cross-linking treatment at a suitable stage before, during, or after the drying step. The surface cross-linking treatment is carried out before and/or after the sorting step, preferably before the sorting step. For example, the surface cross-linking treatment is carried out by heating, preferably at 70° C. or higher and 250° C. or lower, more preferably 150° C. or higher and 250° C. or lower, still more preferably 170° C. or higher and 230° C. or lower, particularly preferably 180° C. or higher and 220° C. or lower, at the same time as the drying step or after the drying step. Note that, the heating temperature is defined by a heat medium temperature in case of using a heat medium in the dryer, but the heating temperature can be defined by a temperature of the hydrogel cross-linked polymer in case where the heating temperature cannot be defined by the heat medium temperature, e.g., in case of using a microwave.

The heating time is preferably one minute or more and three hours or less, more preferably five minutes or more and two hours or less, still more preferably 10 minutes or more and one hour or less. It is possible to reduce particle adhesion in the drying step by adding the surface cross-linking agent to the hydrogel cross-linked polymer which has not been dried and by drying the resultant mixture.

As a device for carrying out the aforementioned heating treatment, a known dryer or a known oven is used. Favorable examples thereof include an electric heat conductive type dryer or oven, a radiation conductive type dryer or oven, hot air conductive type dryer or oven, and a dielectric heating type dryer or oven. Specific examples thereof include a belt type dryer or oven, a groove type stirring dryer or oven, a screw dryer or oven, a rotary dryer or oven, a disk dryer or oven, a kneading dryer or oven, a fluidized-bed dryer or oven, an airflow dryer or oven, an infrared dryer or oven, and an electron dryer or oven.

Favorable examples of the surface cross-linking agent include: an oxazoline compound (U.S. Pat. No. 6,297,319), a vinyl ether compound (U.S. Pat. No. 6,372,852), an epoxy compound (U.S. Pat. No. 6,265,488), an oxethane compound (U.S. Pat. No. 6,809,158), a polyhydric alcohol compound (U.S. Pat. No. 4,734,478), polyamidepolyamine-epihalo adduct (U.S. Pat. No. 4,755,562 and U.S. Pat. No. 4,824,901), hydroxyacrylamide compound (U.S. Pat. No. 6,239,230), an oxazolidinone compound (U.S. Pat. No. 6,559,239), a bis or poly oxazolidinone compound (U.S. Pat. No. 6,472,478), 2-oxotetrahydro-1,3-oxazolidinone compound (U.S. Pat. No. 6,657,015), an alkylenecarbonate compound (U.S. Pat. No. 5,672,633), and the like. These compounds are used independently or in a combination of two or more kinds. In addition to the surface-cross-linking agent, water-soluble cation such as aluminum salt (U.S. Pat. No. 6,605,673, U.S. Pat. No. 6,620,899) may be used, or alkali (U.S. Patent No. 2004-106745) and organic acid or inorganic acid (U.S. Pat. No. 5,610,208) may be used. Further, it may be so arrange that a monomer is polymerized on a surface of the water absorbent resin so as to carry out surface cross-linking (U.S. Patent No. 2005-48221), or it may be so arranged that surface cross-linking is carried out with a peroxide (U.S. Pat. No. 4,783,510).

Specific examples of the surface cross-linking agent include: polyhydric alcohols such as (di, tri, tetra, poly) ethyleneglycol, (di, poly)propyleneglycol, 1,3-propanediol, 2,2,4-trimethyl-1,3-pentandiol, (poly)glycerin, 2-butene-1, 4-diol, 1,4-butandiol, 1',3-butandiol, 1,5-pentandiol, 1,6-hexanediol, trimethylolpropane, di or triethanolamine, pentaerythritol, and sorbitol; epoxy compounds such as (poly) ethyleneglycol diglycidyl ether, (di, poly)glycerol diglycidyl ether, (di, poly)propyleneglycol diglycidyl ether, and glycidol; multivalent amine compounds such as ethylenediamine, diethylenetriamine, triethylenetetramine, tetraethylenepentamine, pentaethylenehexamine, and polyethyleneimine, and inorganic salts or organic salts thereof (for example, azetidinium salt and the like); multivalent isocyanate compounds such as 2,4-tolylenediisocyanate; multivalent oxazoline compounds such as 1,2-ethylenebisoxazoline; alkylene carbonate compounds such as 1,3-dioxolane-2-one; a cyclic urea compound; a multivalent metal compound such as aluminum sulfate; and the like.

Above all, it is preferable to use at least one kind of compound selected from a group made up of the polyhydric alcohol compound, the epoxy compound, the polyvalent metal salt (preferably, aluminum salt), the polyhydric amine compound and salt thereof, and the alkylenecarbonate compound. Note that, in view of the effect, the surface cross-linking may be carried out twice or more times. In this case, the second or further steps may be carried out by using the same surface cross-linking agent as the first step, or may be carried out by using a surface cross-linking agent different from the surface cross-linking agent used in the first step.

Above all, the polyhydric alcohol compound has a high property and gives a plasticity to a surface of the water absorbent resin, so that it is preferable to use the polyhydric alcohol compound as at least one of surface cross-linking treatment components so as to carry out the surface cross-linking treatment.

In order to achieve the below-described properties, although depending on compounds used or a combination thereof, an amount of the surface cross-linking agent is preferably 0.001 parts by mass or more and 10 parts by mass or less, with respect to 100 parts by mass of the water absorbent resin powder, and it is particularly preferable that its lower limit is 0.01 parts by mass and its upper limit is 5 parts by mass.

In carrying out the surface cross-linking, it is preferable to use water as solvent to mix the water absorbent resin and the surface cross-linking agent. Although depending on a type, a particle diameter, a moisture content, and the like of a water absorbent resin precursor, an amount of water used is preferably more than 0 part by mass and 20 parts by mass or less, and more preferably 0.5 parts by mass or more and 10 parts by mass or less, with respect to 100 parts by mass of solid components of the water absorbent resin.

Further, at the time of the surface cross-linking, a hydrophilic organic solvent may be used together as necessary in mixing the water absorbent resin and the surface cross-linking agent. With respect to 100 parts by mass of the water absorbent resin powder, an amount of the organic solvent is preferably 0 part by mass or more and 20 parts by mass or less, more preferably 0 parts by mass or more and 10 parts by mass or less. It is most preferable not to use the hydrophilic organic solvent (substantially 0 part by mass).

In carrying out the surface cross-linking, it is preferable to adopt a method in which water and/or the hydrophilic organic solvent and the surface cross-linking agent are mixed in advance and then an aqueous solution thereof is sprayed or dropped onto the water absorbent resin precursor, and it is more preferable to mix them in a spraying manner. As to a size of the sprayed droplet, an average particle diameter thereof is preferably within a range from 0.1 to 300 μm, more preferably within a range from 0.1 to 200 μm.

[Addition of Additive]

In the present invention, if water-insoluble fine particles are used as the additive apart from the surface cross-linking agent, it is possible to improve a liquid permeability of the water absorbent resin, an anti-blocking property of the water absorbent resin at the time of moisture absorption, and a similar property. As the water-insoluble fine particles, inorganic or organic water-insoluble fine particles whose average particle diameter is preferably 10 μm or less, more preferably 1 μm or less, particularly preferably 0.1 μm or less are used. Specific examples thereof include metal soap, silicon oxide (product name: Aerosil made by Nippon Aerosil Co., Ltd.), titanium oxide, aluminum oxide, and the like. Mixing of the water-insoluble fine particles is carried out by a method such as dry-blending or slurry blending. An amount of the water-insoluble fine particles used is preferably not less than 10 parts by mass, more preferably 0.001 to 5 parts by mass, and still more preferably 0.01 to 2 parts by mass, all with respect to 100 parts by mass of the water absorbent resin.

In the present invention, in addition to the surface cross-linking agent, other additives may be added as required. Examples of such other additives include: deodorant agents; antibacterial agents; fragrant material; foaming agents; pigment; dye; hydrophilic staple fibers; plasticizers; adhesives; surfactants; fertilizer; oxidants; reducers; water; salt; chelating agents; disinfectants; hydrophilic polymers such as polyethylene glycol and polyethylene imine; hydrophobic polymers such as paraffin; thermoplastic resins such as polyethylene and polypropylene; and thermo-setting resins such as polyester resin and urea resin. These additives may be added in an adding step to impart various functions to the water absorbent resin. These additives are used in an amount of generally 0 part by mass or more and 10 parts by mass or more, preferably 0 part by mass or more and 1 part by mass or less.

The additives (water-insoluble fine particles; deodorant agents; antibacterial agents; fragrant material; foaming agents; pigment; dye; hydrophilic staple fibers; plasticizers; adhesives; surfactants; fertilizer; oxidants; reducers; water; salt; chelating agents; disinfectants; hydrophilic polymers such as polyethylene glycol and polyethylene imine; hydrophobic polymers such as paraffin; thermo-plastic resins such as polyethylene and polypropylene; and thermo-setting resins such as polyester resin and urea resin; and the like) may be added to an internal portion of the hydrogel cross-linked polymer or a dried resultant thereof, but it is preferable to coat a surface of the hydrogel cross-linked polymer or the dried resultant thereof. In the present specification, "surface coating" means to coat the surface of the hydrogel cross-linked polymer or the dried polymer with the additive without carrying out the cross-linking. For example, the surface coating is carried out as required in order to improve the fluidity or to achieve a similar object.

The surface treatment step covers a case where both the surface cross-linking and the surface coating are carried out, a case where the surface cross-linking is not carried out but the surface coating is carried out, and a case where the surface coating is not carried out but the surface cross-linking is carried out.

Note that, also the hydrogel cross-linked polymer having been subjected to the surface treatment step and the dried polymer are sometimes referred to as the water absorbent resin generically in the present specification.

<Continuous Production>

In the method according to the present invention for producing the water absorbent resin powder, the water absorbent resin having a large amount of foreign matters may be treated in a batch manner or may be continuously treated. Preferably, after the drying step, a continuous transport step which links the pulverization step, the classification step, and respective production steps is further included. That is, the production method according to the present invention can be favorably applied to a case of continuously producing the water absorbent resin powder, particularly, a case of continuously producing the water absorbent resin powder for 30 days or more, further 60 days or more, moreover 120 days or more, particularly 240 days or more. Note that, the continuous production in the present invention corresponds to a period in which articles having the same production number are continuously produced, and corresponds to a time and day until which the production number is changed or the production is temporarily stopped. The production number is changed by suitably changing the production conditions (the cross-linking agent and the amount thereof for example).

Further, the aforementioned "respective production steps" are not particularly limited as long as the steps are carried out after the drying step. For example, not only the surface treatment step and the sorting step, but also (i) steps for carrying out the above-described granulation, addition of the additives, sizing, and the like, (ii) a metallic foreign substance removal step described in a below-described Production Example 1 and Patent Document 6, (iii) and the like can be carried out as the respective production steps. A typical continuous flow of the continuous production is described in Patent Document 6, U.S. Pat. No. 6,727,345, U.S. Patent Publication No. 2004-110006, and the like, and also the flow is favorably applicable to the present invention. For example, in case of carrying out the continuous production, it is possible to carry out the sorting step at least once after the drying step of such a flow.

Conventionally, the long-term continuous production is likely to increase the amount of foreign matters as time goes on. Thus, it is necessary to stop the production and to regularly repair the industrial plant. However, according to the present invention, such regular repair is not required and it is possible to continuously produce the water absorbent resin powder having high properties for an extended period of time. Note that, the present invention is favorably applicable to large-scale continuous production of such a large amount of water absorbent resin powder that foreign matters are likely to occur, e.g., 100 Kg/hr or more, preferably 500 Kg/hr or more.

At the time of the continuous production, a large amount of foreign matters are found in switching products, changing production conditions, and restarting the operation, so that an upper limit of the time period in which the continuous production is carried out is not particularly limited, but is preferably 1000 days or less, more preferably 800 days or less, particularly preferably 500 days or less.

This is because: the foreign matters are carbonated which results from surface burning of the water absorbent resin due to long-time heat history, and a part of the particles remains in the device (particularly in a heated portion thereof) and then is discharged and mixed into the product, so that the foreign matters are likely to occur during the so-called continuous production including the drying step, the pulverization step, the classification step, and the continuous transport step. Above all, the foreign matters are likely to occur particularly in the drying step, the surface treatment step, or the cooling step thereof. Note that, the "cooling step" is a step of stopping or controlling the cross-linking reaction by cooling, and is described in U.S. Patent Publication No. 2004-181031 for example.

The pulverization step is a step of causing a pulverizer to pulverize the dried hydrogel cross-linked polymer. Examples of the pulverizer used in the pulverization step include a roller mill, a knife mill, a hummer mill, a pin mill, various kinds of cutter, a jet mill, and the like. It is preferable that the pulverizer includes means for heating an internal wall surface of the pulverizer itself. Note that, the "pulverization" means not only cutting the dried polymer into indefinite-shape pieces but also cutting the dried polymer into polyhedral-shape pieces.

In the pulverization step, it is preferable that the internal wall surface of the pulverizer is heated from the outside or an internal wall surface temperature of the pulverizer is kept higher than a temperature of the water absorbent resin by 20° C. or higher. This is because: the dried polymer particles obtained by carrying out the pulverization adhere to the internal wall of the pulverizer and constitute a greater agglomerate, and the agglomerate falls off from the internal wall due to vibration of the pulverizer, so that the agglomerate is likely to be mixed into the product.

The classification step is a step of continuously classifying the dried polymer particles obtained in the pulverization step. In the classification step, although not limited, it is preferable to carry out sieve classification (using a metal sieve made of stainless steel). For desired properties and particle size, it is preferable to simultaneously use a plurality of sieves in the classification step, and it is preferable to carry out the sieve classification before the surface cross-linking, further, twice or more times before and after the surface cross-linking. In case of carrying out the sieve classification, it is preferable to heat the sieve or to keep the sieve warm.

However, if the sieve classification is carried out at a high temperature, a moisture content of the dried polymer powder decreases, so that the dried polymer powder becomes hard. As a result, the hardness greatly damages the sieve, so that fine metallic foreign substances may be likely to be mixed into the dried polymer powder. Further, the long-time heat history causes occurrence of the foreign matters. Thus, it is preferable to set a temperature of the sieve not to be high (preferably 40° C. or higher and 100° C. or lower, more preferably 50° C. or higher and 80° C. or lower).

The continuous transport step is a step of causing a transport apparatus or the like to continuously transport the dried polymer powder after pulverizing the dried hydrogel cross-linked polymer (water absorbent resin). Examples of the transport apparatus used in the continuous transport step include a belt conveyer, a screw conveyer, a chain conveyer, a vibration conveyer, a pneumatic conveyer, and the like, or an apparatus including means for heating its internal wall surface from the outside and/or means for keeping the internal wall surface warm. Above all, it is preferable to use the chain conveyer or the pneumatic conveyer. In the continuous transport step, in view of the conveying property, higher one of (i) a temperature of the dried polymer powder and (ii) an internal temperature of the transport apparatus is set to preferably 40° C. or higher and 100° C. or lower, more preferably 50° C. or higher and 80° C. or lower. If the dried polymer powder is heated or kept warm in this manner, this improves the reactivity, but it was also found that this causes occurrence of the foreign matters when the dried polymer powder remains.

As to the continuous transport step, it is preferable that at least a part thereof is carried out by pneumatic transport. Also in order to reduce damage (property decrease) of the dried polymer powder, i.e., the high-property water absorbent resin which is caused by the transport and also in order to suppress the metallic foreign substances from being mixed, it is preferable that a part of the continuous transport is carried out by pneumatic transport. In the continuous transport step, it is preferable that the internal wall surface of the transport apparatus is heated from the outside and/or the internal wall surface is kept warm. This is because such arrangement is likely to effectively prevent formation of the agglomerate.

Note that, the "pneumatic transport" is disclosed by U.S. Patent Publication No. 2004-345804, U.S. Patent Publication No. 2004-242761, U.S. Patent Publication No. 2005-113252, and the like.

A timing at which the sorting step is carried out is not particularly limited as long as the sorting step is carried out after the drying step. For example, the sorting step may be carried out during the pulverization step, the classification step, and the continuous transport step, after the drying step, or may be carried out right before or right after packaging the final product. Further, the sorting step may be carried out plural times and may be carried out at plural stages in the production steps. Above all, the foreign matters are more likely to occur in latter stages of the production steps, and the foreign matters are likely to occur particularly in a surface cross-linked product, so that it is preferable to carry out the sorting step after the surface cross-linking, particularly after the classification after the surface cross-linking, further, right before or right after packaging the final product.

Note that, it is not necessary to carry out the color sorting with respect to the entire amount of the water absorbent resin, and a Lot in which foreign matters occurred is selected and the color sorting is carried out with respect to only the selected Lot. Further, the color sorting may be carried out only when any trouble happens in the production steps or may be carried out when foreign matters begin to occur with long-time continuous production. Furthermore, the color sorting may be carried out with respect to only a packaged product (a container or a bag) in which foreign matters were found after packaging each product.

Further, a color (black foreign substance) of the foreign matter having a greater particle diameter is visually more conspicuous, and the foreign matter can be easily removed by the color sorting, so that a removal rate is improved. Thus, it is preferable not to carry out the color sorting with respect to the whole water absorbent resin but to carry out classification with respect to the water absorbent resin and carry out the color sorting with respect to only large particles. Further, it was found that relatively small particles have less foreign matters. Also from such a view point that it is not efficient to carry out the color sorting with respect to the whole particles and such color sorting decreases the yield, it is preferable to carry out classification with respect to the water absorbent resin and to carry out the color sorting with respect to only large particles.

Specifically, the color sorting is carried out with respect to only particles whose particle diameter is 300 μm or more, more preferably 600 μm or more, particularly preferably 850 μm or more, defined by standard sieve classification, thereby carrying out efficient color sorting. Further, not only entirely color particles but also partially color particles, e.g., large particles having a mm order, may be sorted.

Note that, the water absorbent resin is temporarily stored in a hopper or the like as necessary after the color sorting and then is packaged, but a package style of a final product is not particularly limited as long as the package allows non-water-permeable and non-moisture-permeable sealing. For example, a container or a bag can be used, and a content of each package generally ranges from 20 Kg to 20000 Kg, more preferably from 100 Kg to ~10000 Kg, particularly preferably from 500 Kg to 5000 Kg.

A large number of agglomerates are colored, and as described above, the color sorting apparatus 1 may determine whether or not to exclude the agglomerates depending on the size of the foreign matter, so that the sorting step may be carried out with respect to only water absorbent resin having a rough particle size. Of course, the sorting step may be carried out with respect to the entire amount. The sorting step is carried out with respect to only particles having a rough particle size in case of providing water absorbent resin remaining on the sieve in the classification step for example (e.g., water absorbent resin whose particle diameter is 850 μm or more defined in standard sieve classification) or in a similar case.

The water absorbent resin sorted as a defective product in the sorting step may be further subjected to the sorting step repeatedly for higher purity. The water absorbent resin finally sorted as a defective product may be removed and may be used for purpose which requires no whiteness, e.g., for a soil water retaining agent, a waste fluid solidifying agent, and the like. However, the water absorbent resin is preferably subjected to a re-treatment step of breaching out the water absorbent resin.

As the breaching-out method, a conventionally known method can be used, and the breaching-out method is not particularly limited. For example, it is possible to breach out the water absorbent resin by using chlorine, alkali, enzyme, and the like. Other example of the method for re-treating the water absorbent resin sorted as a defective product is a method in which gelatinization with a monomer causes the amount of the foreign matters to be not more than the detection limit.

Further, the method according to the present invention for producing water absorbent resin powder may include a metallic foreign substance removal step which causes a magnetic field whose magnetic flux density is 0.05 Wb/m$^2$ or more to pass through the water absorbent resin in production steps carried out after the drying step. The metallic foreign substance removal step is a step of causing a magnetic field to pass through a fixed or moving water absorbent resin, preferably a continuously flowing water absorbent resin, more preferably a continuously transported water absorbent resin. The water absorbent resin is subjected to the step, so that it is possible to efficiently remove metallic foreign substances included in the water absorbent resin. As a result, it is possible to keep the high properties of the water absorbent resin. Note that, as the metallic foreign substance removal step, a method described in Patent Document 6.

(2. Particulate Water Absorbing Agent)

The particulate absorbing agent in the present invention refers to an aqueous liquid absorbing and solidifying agent including a water absorbent resin (as a main component) and preferably contains a specific amount of water (moisture content ranges from 0.5 to 20 mass %, preferably from 1 to 15 mass %, particularly preferably from 2 to 10 mass %). The aqueous liquid absorbing and solidifying agent contains water, so that it is possible to improve a water absorbing rate and a crashproof property, and it is possible to realize higher properties, and it is possible to at least keep the property from decreasing. Note that, in the present specification, the "particulate water absorbing agent" is a synonymous of the "water absorbent resin powder" in case where a below-described "(g) Other additives" are not included.

An amount of the water absorbent resin included in the particulate water absorbing agent is not particularly limited, but generally ranges from 70 to 100 mass %, preferably from 70 to 98 mass %, more preferably from 80 to 98 mass %, particularly preferably from 90 to 98 mass %, with respect to the entire amount of the particulate water absorbing agent.

Further, the particulate water absorbing agent may contain the above described additives as required. Note that, the aqueous liquid is not limited to water, but may be urine, blood, feces, waste fluid, moisture, vapor, ice, a mixture of water and organic solvent, a mixture of water and inorganic solvent, rain water, ground water, and the like, as long as the aqueous liquid includes water. It is preferable that the particulate water absorbing agent is an absorbing and solidifying agent which absorbs and solidifies urine, particularly human urine, out of the aforementioned aqueous liquids.

<An Example of Production Method of Particulate Water Absorbing Agent>

The particulate water absorbing agent can be obtained by a production method including the following steps (A) to (E) for example.

(A) A step of preparing a monomer component in which acrylic acid and/or salt thereof is contained as a main component and at least a part of the acrylic acid salt is ammonium salt and/or amine salt.

(B) A step of carrying out aqueous solution polymerization with respect to the monomer component by using an azo polymerization initiator.

(C) A step of obtaining dried powder in which an amount of particles having a particle diameter less than 150 μm is 0 mass % or more and 5 mass % or less and a mass average particle diameter (D50) is 200 μm or more and 450 μm or less and a logarithmic standard deviation (σζ) is 0.20 or more and 0.40 or less, after the polymerization.

(D) A step of carrying out surface cross-linking with respect to the powder.

(E) A step of carrying out color sorting with respect to the surface cross-linked powder.

Note that, the aforementioned production method is an example, and the production method is not limited to the aforementioned production method as long as the particulate water absorbing agent satisfies the following properties (1) to (3). The particulate water absorbing agent obtained by the above-exemplified production method is a novel particulate water absorbing agent having high properties and excellent white appearance. Note that, substantially nothing other than the amount of the foreign matters changes before and after the color sorting, so that the water absorbent resin having the specific properties, i.e., the high properties is obtained and the water absorbent resin is subjected to the color sorting in the present invention.

That is, the particulate water absorbing agent includes the water absorbent resin produced by the production method according to the present invention, and satisfies the following conditions (a) to (c).

(a) An absorbency against pressure (AAP: 0.90 g) is 20 g/g or more and 60 g/g or less.

(b) An amount of contained foreign matters is 5 mm²/100 g or less.

(c) An amount of particles having a particle diameter less than 150 μm is 0 mass % or more and 5 mass % or less and a mass average particle diameter (D50) is 200 μm or more and 550 μm or less and a logarithmic standard deviation (σζ) of particle size distribution is 0.20 or more and 0.40 or less.

As to an absorbency in 0.90 mass % sodium chloride aqueous solution against a pressure of 4.8 kPa for 60 minutes, an absorbency of 0.9 g of the particulate water absorbing agent is (AAP: 0.90 g).

It is preferable that the water absorbent resin is obtained by polymerizing a monomer including an acrylic acid salt monomer as a main component. By using the acrylic acid salt monomer, it is possible to further improve the water absorbing performance and the safety of the resultant hydrogel, so that it is possible to improve the water absorbing performance and the safety of the particulate water absorbing agent including the water absorbent resin. The water absorbent resin before or after the color sorting preferably has below described properties "(a) PPUP", "(c) Particle size in standard sieve classification", "(d) Absorbency against pressure", and "(e) Centrifugal retention capacity (GVs) and extractable polymer content". Further, an amount of the foreign matters included in the water absorbent resin having been subjected to the color sorting is described in below-described "(b) Foreign matters". The properties are suitably adjusted in the aforementioned steps such as the polymerization step, the pulverization step, and the surface cross-linking step, and the like.

(a) PPUP (Permeability Potential Under Pressure)

As to the particulate water absorbing agent, its permeability potential under pressure (PPUP) is preferably 50% or more and 100% or less, more preferably 60% or more and 100% or less, most preferably 70% or more and 100% or less. Note that, unlike the absorbency against pressure (AAP: 0.9 g), the permeability potential under pressure is an index indicative of stability (less decrease) of the absorbency against pressure (AAP) in increasing an amount of the water absorbent resin (an amount of resin for each measured area) from 0.90 g to 5.0 g.

For example, the amount of the water absorbent resin (an amount of resin for each measured area) varies depending on a portion in a diaper, so that variation of the absorbency against pressure (AAP) which is caused by variation of the amount of the resin causes properties of the diaper in actual use to decrease. In case where the PPUP is extremely high, it is possible to stably exhibit high properties regardless of the amount (concentration) of the water absorbent resin in the diaper, and it is possible to exhibit higher liquid permeability. The permeability potential under pressure (PPUP) is detailed in Japanese Unexamined Patent Publication No. 2005-109779 (filed on Apr. 6, 2005, corresponding to WO2006-109844), and such description is applied to the present invention.

(b) Foreign Matters

In the particulate water absorbing agent, after the color sorting, the amount of the foreign matters is preferably 5 mm²/100 g or less, more preferably 3 mm²/100 g or less, most preferably 1 mm²/100 g or less and substantially 0 (undetectable). The foreign matters whose amount is 5 mm²/100 g or less are hardly observed by eyes, so that this value is important in view of a critical point when the particulate water absorbing agent is actually used for a diaper and the like. Within the range, the foreign matters do not show any uncomfortable appearance to the consumer even though the foreign matters are included in a white pulp of a diaper, a napkin, or the like. The water absorbent resin used in the particulate water absorbing agent can be obtained by the method according to the present invention for producing the water absorbent resin and is subjected to the aforementioned sorting step, so that the amount of the foreign matters contained in the particulate water absorbing agent is extremely small. Thus, the particulate water absorbing agent has excellent whiteness and is less likely to be colored.

(c) Particle Size in Standard Sieve Classification

In view of the properties, it is necessary that a mass average particle diameter (D50) of the particulate water absorbing agent is 200 μm or more and 10 μm or less; further 300 μm or more and 10 μm or less (preferably 600 μm or less). However, the mass average particle diameter (D50) is preferably 350 μm or more and 550 μm or less, more preferably 400 μm or more and 500 μm or less. Particularly in case where the particulate water absorbing agent is used for a sanitary material such as a diaper, particles having other particle size are mixed or separated as required, thereby adjusting the mass average particle diameter (D50) to 200 μm or more and 550 μm or less, preferably 250 μm or more and 500 μm or less, more preferably 300 μm or more and 450 μm or less, particularly preferably 350 μm or more and 400 μm or less. The particle size can be controlled not only in the pulverization step and the classification step but also in the sorting step as necessary.

Further, it is more preferable that an amount of fine powder whose particle diameter is 150 μm or less (defined by standard sieve classification) is smaller. The amount of the fine power is adjusted to generally 0 mass % or more and 5 mass % or less, preferably 0 mass % or more and 3 mass % or less, particularly preferably 0 mass % or more and 1 mass % or less.

Further, it is more preferable that an amount of particles whose particle diameter is 850 μm or less (defined by standard sieve classification) is smaller. The amount of the particles is adjusted to generally 0 mass % or more and 5 mass % or less, preferably 0 mass % or more and 3 mass % or less, particularly preferably 0 mass % or more and 1 mass % or less. The logarithmic standard deviation ($\sigma\zeta$) of particle size distribution is 0.10 or more and 0.45 or less, preferably 0.20 or more and 0.40 or less, more preferably 0.27 or more and 0.37 or less, further more preferably 0.25 or more and 0.35 or less.

In case where the logarithmic standard deviation ($\sigma\zeta$) deviates from the foregoing particle size distribution, the particulate water absorbing agent exhibits less effect in being used as an absorbing article such as a disposable diaper or the like. The particle size is suitably adjusted by carrying out pulverization, classification, fine powder collection, granulation, and the like.

Further, a bulk density (defined by JIS K-3362) of the particulate water absorbing agent is preferably 0.40 g/ml or more and 0.90 g/ml or less, more preferably 0.50 g/ml or more and 0.80 g/ml or less.

(d) Absorbency Against Pressure (AAP)

With respect to physiological saline, the particulate water absorbing agent has an absorbency against pressure (4.8 kPa: 0.90 g) of preferably 1:5 g/g or more, more preferably 20 g/g or more, more preferably 23 g/g or more, still more preferably 25 g/g or more. Further, also an absorbency against pressure (1.9 kPa: 0.90 g) with respect to physiological saline is generally 15 g/g or more, preferably 20 g/g or more, more preferably 25 g/g or more, still more preferably 28 g/g or more, particularly preferably 32 g/g or more. An upper limit of each absorbency against pressure is not particularly limited, but is generally about 60 g/g in view of (i) balance with other properties and (ii) cost performance.

(e) Centrifugal Retention Capacity (GVS) and Extractable Polymer Content

The particulate water absorbing agent has a centrifugal retention capacity (GVs: referred to also as CRC) of 10 g/g or more and 50 g/g or less, preferably 28 g/g and 50 g/g or less, more preferably 28 g/g or more and 45 g/g or less, still more preferably 30 g/g or more and 45 g/g or less, particularly preferably 30 g/g or more and 40 g/g or less. When CRC is excessively high, other properties decrease, e.g., a gel strength, urine-proof property, and the like decrease. When CRC is excessively low, an absorption amount is not sufficient in being actually used for a diaper. Further, the extractable polymer content is preferably 0 mass % or more and 25 mass % or less, more preferably 0 mass % or more and 15 mass % or less, still more preferably 0 mass % or more and 10 mass % or less.

(f) Residual Monomer

Further, an amount of the residual monomer of the particulate water absorbing agent is 0 mass ppm or more and 400 mass ppm or less, more preferably 0 mass ppm or more and 300 mass ppm or less, particularly preferably 0 mass ppm or more and 200 mass ppm or less, most preferably 0 mass ppm or more and 100 mass ppm or less. Such a residual monomer is achieved by carrying out neutralization with ammonium or by using an azo polymerization initiator for example.

(g) Other Additives

Further, in order to provide various functions as a required function, the particulate water absorbing agent may include: water-insoluble inorganic or organic powder, e.g., a chelating agent (exemplified in U.S. Pat. No. 6,599,989 for example), an oxidizing agent (exemplified in U.S. Patent Publication No. 2006-183828 for example), a reducing agent such as bisulfite (hydrogen) salt (exemplified in U.S. Pat. No. 4,863,989 for example), a chelating agent such as aminocarboxylate (exemplified in U.S. Pat. No. 6,469,080 for example), silica and metal soap (exemplified in U.S. Patent Publication No. 2005-0118423), and the like; a surfactant (exemplified in U.S. Pat. No. 6,107,358 for example); a deodorant; an antibacterial agent; polymer polyamine; pulp; thermoplastic fiber; and the like so that an amount thereof is 0 mass % or more and 3 mass % or less, preferably 0 mass % or more and 1 mass % or less.

A moisture content (100-solid content (%)) of the particulate water absorbing agent is 0.1 mass % or more and 12 mass % or less, preferably 2 mass % or more and 10 mass % or less, more preferably 2 mass % or more and 8 mass % or less, still more preferably 2 mass % or more and 7 mass % or less, particularly preferably 2 mass % or more and 6 mass % or less, most preferably 2 mass % or more and 5 mass % or less. If the moisture content deviates from the range of from 0.1 mass % to 12 mass %, the water absorbing agent is inferior in powder properties (fluidity, transportability, and anti-damage property).

In the present invention, the water absorbent resin powder obtained by polymerizing an unsaturated monomer containing acrylic acid and/or salt thereof as a main component is packaged in a non-permeable bag or a non-permeable container, and each package contains 20 Kg to 200000 Kg of the water absorbent resin powder, and the water absorbent resin powder satisfies the following conditions (a) to (c).

(a) An absorbency under load (AAP: 0.90 g) is 20 g/g or more and 60 g/g or less.

(b) An amount of contained foreign matters is 5 mm$^2$/100 g or less.

(c) An amount of particles having a particle diameter less than 150 μm is 0 mass % or more and 5 mass % or less and a mass average particle diameter (D50) is 200 μm or more and 550 μm or less and a logarithmic standard deviation ($\sigma\zeta$) of particle size distribution is 0.20 or more and 0.40 or less.

As to an absorbency in 0.90 mass % sodium chloride aqueous solution under a load of 4.8 kPa for 60 minutes, the absorbency of 0.9 g of the particulate water absorbing agent is (AAP: 0.90 g).

The package of the water absorbent resin powder has a small amount of foreign matters in view of a critical point, so that the foreign matters are not observed by eyes and the properties are high. Thus, the package is favorably applicable to industrial production of final consumer products such as diapers.

The package of the water absorbent resin powder is characterized not only in its high properties but also in its production volume of not less than 100 Mton (Mton=Metric ton=1000 kg). Conventionally, when a large amount of the water absorbent resin powder is industrially produced unlike laboratory-level production, problems such as incorporation of foreign matters and lower properties occur. However, the present invention can provide the water absorbent resin powder which is free from any foreign matters even if 100

Mton or more of the water absorbent resin powder is industrially produced. Thus, it is possible to provide the high-property water absorbent resin powder which is suitable for mass consumption and free from any foreign matters and which exhibits high properties in a diaper and does not have uncomfortable appearance derived from the foreign matters. The production volume is, in total, 100 Mton or more, preferably 1000 Mton or more, more preferably 10000 Mton or more, still more preferably a total production volume, particularly preferably an annual production volume.

(3. Purpose of Use)

The purpose of use of the water absorbent resin powder and the particulate water absorbing agent which are produced by the method of the present invention for producing the water absorbent resin powder is not particularly limited as described in the <Properties of water absorbent resin powder>. However, it is preferable to use the water absorbent resin powder and the particulate water absorbing agent for absorbing articles such as a disposable diaper, a sanitary napkin, and an incontinence pad. Particularly, the water absorbing agent has high properties and excellent whiteness and is less likely to be colored, so that the water absorbing agent is favorably used for a high concentration diaper (a diaper containing a large amount of water absorbent resin) which conventionally raised problems such as odor derived from a material of the water absorbing agent and uncomfortable appearance caused by foreign substances. Particularly, in case where the water absorbing agent is used for an absorbent core top layer of the absorbing article, it is possible to exhibit particularly excellent properties. The water absorbent resin powder according to the present invention or the water absorbent resin powder obtained by the production method according to the present invention does not show uncomfortable appearance to the consumer even when the water absorbent resin powder is in a white pulp.

The absorbing article includes: (a) the particulate water absorbing agent, (b) an absorbent core obtained by forming a hydrophilic fiber into a sheet shape as required, (c) a liquid permeable front sheet, and (d) a liquid impermeable back sheet. The absorbent core in case where the hydrophilic fiber is not used is arranged by fixing the water absorbing agent onto paper and/or nonwoven fabric.

The absorbing article, including child diapers, adult diapers, and sanitary napkins, are produced in the following manner: The particulate water absorbing agent is blended or sandwiched with a fiber base material, for example, a hydrophilic fiber, to form an absorbent core. The absorption core is then sandwiched between a liquid permeable base material (front sheet) and a liquid impermeable base material (back sheet). Thereafter, an elasticity member, a diffusion layer, and/or adhesive tape is fitted if necessary.

The absorbent core contains the particulate water absorbing agent at an amount (core concentration) of 30 mass % or more and 100 mass % or less, preferably 40 mass % or more and 100 mass % or less, more preferably 50 mass % or more and 100 mass % or less, still more preferably 60 mass % or more and 100 mass % or less, particularly preferably 70 mass % or more and 100 mass % or less, most preferably 75 mass % or more and 95 mass % or less. For example, in case of using the particulate water absorbing agent with the aforementioned concentration, particularly in case of using the particulate water absorbing agent for an absorbent core top layer, high permeability (permeability potential under pressure) results in an excellent diffusion property with respect to absorbed liquid such as urine, so that it is possible to provide an absorbing article such as a disposable diaper whose absorption amount is increased due to efficient liquid distribution and whose absorbent core keeps its sanitary whiteness.

Further, it is preferable that the absorbent core is compression molded to a density of 0.06 g/cc or more and 0.50 g/cc or less and a basic weight of 0.01 $g/cm^2$ or more and 0.20 $g/cm^2$ or less. The fiber base material used is, for example, crushed wood pulp or a hydrophilic fiber such as a cotton linter, a cross-linked cellulose fiber, rayon, cotton, wool, acetate, or vinylon. These fiber base materials are preferably aerated.

Note that, the present invention is not limited to the description of the embodiments above, but may be altered by a skilled person within the scope of the claims. An embodiment based on a proper combination of technical means disclosed in different embodiments is encompassed in the technical scope of the present invention.

EXAMPLES

Through the following examples and comparative examples, the present invention is described more specifically. However, the present invention is not limited to the following examples and the like, as long as the present invention is interpreted in light of a gist thereof. Note that, properties of the particulate water absorbing agent were measured in the following measurement methods.

(1) Centrifugal Retention Capacity (Absorbency without any Pressure in 30 Minutes with Respect to 0.90 Mass % of Sodium Chloride Aqueous Solution (CRC))

0.200 g of water absorbent resin powder was evenly contained in a bag (60 mm×60 mm) made of a nonwoven fabric at room temperature (20° C. or higher and 25° C. or lower) and at a humidity of 50 RH %. Then, the bag was soaked in 0.90 mass % physiological saline whose temperature was a room temperature, and was withdrawn 30 minutes later. By using a centrifugal separator (centrifugal machine made by KOKUSAN Corporation: model type is H-122), the bag was drained for three minutes at 250G, and a weight W1 (g) of the bag was measured. Further, the same operation was performed without using the water absorbent resin powder or the water absorbing agent, and a mass W0 (g) was measured. Then, from the masses W1 and W0, a centrifugal retention capacity (CRC) (g/g) was calculated according to the following equation.

Centrifugal retention capacity (g/g)=((mass $W1$ (g) mass $W0$ (g))/mass (g) of water absorbent resin powder)

(2) Extractable Polymer Content (Quantity of Water-Soluble Component)

500 mg of the water absorbent resin powder was dispersed into 1000 g of ion exchange water poured in a propylene cup (internal diameter 90 mm×200 mm) having a cover, and the ion exchange water was stirred for 16 hours by using a 4 cm-magnetic stirrer at about 300 to 600 rpm. Then, the hydrogel dispersion liquid was filtered through a piece of filter paper (product of Advantec Toyo Kaisha, Ltd.; product name: JIS P3801, No. 2; thickness: 0.26 mm; diameter of retained particles: 5 μm), thereby obtaining a filtrate.

Next, 50.0 g of the filtrate was measured and poured into a 100 ml beaker, and 1 ml of 0.1N-sodium hydrate aqueous solution (product of Wako Pure Chemical Industries, Ltd.), 10 ml of 0.005N-methylglycol chitosan aqueous solution (product of Wako Pure Chemical Industries, Ltd.), and about 0.2 g of 0.1% toluidine blue (toluidine blue pH indicator produced by Wako Pure Chemical Industries, Ltd.) were added to the filtrate.

Subsequently, the solution of the beaker was subjected to colloidal titration by using 0.0025N-polyvinyl potassium sulfate aqueous solution (product of Wako Pure Chemical Industries, Ltd.), and the titration was finished at the time when a color of the solution changed from blue to purplish red, and then a titration amount D (ml) was measured. Further, the same operation was carried out by using 50 g of ion exchange water instead of 50 g of the filtrate, thereby measuring a titration amount E (ml).

From these titration amounts and an average molecular weight F of the monomer constituting the water absorbent resin powder, an amount of the extractable polymer content (mass %) was calculated in accordance with the following equation.

$$\text{Extractable polymer content (mass \%)}=(E \text{ (ml)}-D \text{ (ml)})\times 0.005/C \text{ (g)}\times F$$

(3) Residual Monomer Amount (Residual Acrylic Acid Amount)

In the operation (2), the ion exchange water was stirred for two hours and was filtered in the same manner, and residual acrylic acid in the filtrate was analyzed in a liquid chromatography.

(4) Mass Average Particle Diameter

The water absorbent resin powder was sieved by using JIS standard sieves (JIS Z8801-1 (2000)) respectively having mesh sizes of 850 μm, 600 μm, 500 μm, 425 μm, 300 μm, 212 μm, 150 μm, 106 μm, 75 μm, and the like, and a residual percentage R was plotted on a logarithmic probability paper. Then, a mass average particle diameter (D50) thereof was read. Note that, the mesh size was suitably changed so as to correspond to the particle diameter. For example, as to particles whose particle diameter is 1 mm or more, it is possible to use a sieve or the like described in U.S. Patent Publication No. 2007-041796.

Note that, conditions of the classification were as follows: 10.0 g of the water absorbent resin powder was spread on JIS standard sieves (THE IIDA TESTING SIEVE: diameter is 8 cm), and was classified by using a sieve shaker (IIDA SIEVE SHAKER, TYPE: ES-65, SER. No. 0501) for ten minutes at the room temperature (20° C. or higher and 25° C. or lower) under the humidity of 50 RH %.

(5) Amount of Included Foreign Matters

An amount of foreign matters (mm²/100 g) included in the water absorbent resin powder was measured in accordance with JIS P8208 (1998) "paper pulp foreign matter testing method". That is, "foreign matter measurement table (Bureau of Engraving and Printing; sold by Choyokai Co; Ltd. (Kitaku, Tokyo)) and "foreign matter measuring apparatus" mentioned in JIS P8208 were used, and 14 drawings whose display area sizes range from 0.05 mm² to 5.0 mm² defined in the foreign matter measurement table (made of transparent polyester film) were respectively overlapped on the water absorbent resin power, thereby selecting a drawing most approximate to the size and the shape of the water absorbent resin powder. Then, an area size of the foreign matters was compared and calculated on the basis of a total of the display area sizes (for example, in case where 10 foreign matters whose area size is 0.05 mm² are found in 100 g of the water absorbent resin powder, this is expressed as 0.5 mm²/100 g). Note that, according to JIS P8208, dusts and shive which are included in a pulp are collectively referred to as "foreign matters", and the foreign matters are not transparent or have colors different from other portions. However, in the present application, color particles (generally black or brown) which can be distinguished by eyes from the water absorbent resin powder (generally white, e.g., YI≤20) on the basis of JIS P8208 are defined as the foreign matters.

(6) How to Measure Absorbency Against Pressure (AAP)

In accordance with a method disclosed in Examples of European Patent No. 0885917 and European Patent No. 0811636, the water absorbent resin powder's absorbency with respect to a physiological saline against a pressure of 4.9 kPa (about 50 g/cm²) was measured. That is, with a load of 50 g/cm² being evenly applied, a mass W2 (g) of the physiological saline absorbed by 0.900 g of the water absorbent resin powder was measured by using a scale. Further, from the mass W2, the absorbency against pressure (g/g) of the water absorbent resin powder having absorbed the physiological saline for 60 minutes was calculated according to the following equation. In this way, the absorbency against pressure (50 g/cm²) was obtained.

$$\text{Absorbency against pressure (g/g)}=\text{mass } W2 \text{ (g)}/\text{mass (g) of water absorbent resin powder}$$

(7) Permeability Potential Under Pressure (PPUP)

The same operation as in measurement (6) of the absorbency against pressure (AAP: 0.90 g) with the load of 4.9 kPa was carried out except that the amount of the water absorbent resin powder was changed from 0.900 g to 5.000 thereby calculating an absorbency against pressure (AAP: 5.0 g). At this time, if the absorbency against pressure (AAP: 5.0 g) is higher, a layer height of the swollen water absorbent resin (or particulate water absorbing agent) is likely to increase, so that it is necessary that a support cylinder used in this operation is sufficiently high. The absorbency against pressure (AAP: 0.90 g) and the absorbency against pressure (AAP: 5.0 g) were used, thereby calculating the permeability potential under pressure (PPUP) in accordance with the following equation.

$$\text{Permeability potential under pressure } (PPUP) \text{ (\%)}=(AAP\text{: 5.0 g (g/g)}/AAP\text{:0.90 g (g/g)})\times 100$$

(8) Coloring of Water Absorbent Resin Powder

A spectral color-difference meter SZ-Σ80 COLOR MEASURING SYSTEM (product of NIPPON DENSYOKU KOGYO) was used to measure an object color of the water absorbent resin powder (about 5 to 10 g) right after production thereof under preset conditions (reflection condition/powdery paste test table (internal diameter: 30 nm)/powdery paste standard white plate No. 2 as a standard/projector pipe of 30Φ). Note that, a promotion test of U.S. Patent No. 20040110914 was not carried out. As YI is smaller, the whiteness is higher. It is preferable that Yi is 15 or less, and it is more preferable that Yi is 10 or less.

(9) Saline Flow Conductivity

The saline flow conductivity (SFC) of 0.69 mass % physiological saline was measured on the basis of a physiological saline flow conductivity test described in U.S. Patent No. 2004-0106745.

By using an apparatus described in U.S. Patent No. 2004-0106745, the water absorbent resin particles or the water absorbing agent (0.900 g) evenly contained in a container was swollen in a synthesized urine (Jayco synthesized urine of the patent) under a pressure of 0.3 psi (2.07 kPa) for 60 minutes, and a height of a gel layer was recorded. Then, 0.69 mass % physiological saline was made to flow from a tank and to pass through the swollen gel layer at a constant hydrostatic pressure. The SFC test was carried out at a room temperature (20° C. or higher and 25° C. or lower).

(Production Example 1 in which Water Absorbent Resin Powder is Produced)

The water absorbent resin powder was continuously provided by using a continuous production apparatus (which allows production of 500 kg of the water absorbent resin powder per an hour) which links the polymerization step (still polymerization on a belt), the gel granulation step, the drying step, the pulverization step, the classification step, the surface treatment step (the cross-linking agent spraying step, the heating step, the cooling step), the classification step, and the metallic foreign substance removal step (see U.S. Pat. No. 6,716,894, Patent Document 6) and can continuously carry out the respective steps.

That is, first, an acrylic acid partial sodium chloride aqueous solution (concentration: 38 mass %) which contained 0.06 mol % (with respect to a monomer) of polyethyleneglycol diacrylate (average n number: 9) serving as an internal cross-linking agent and whose 75 mol % was neutralized was used as a monomer aqueous solution (1), and the resultant monomer aqueous solution (1) was continuously fed by a constant pump, and nitrogen gas was continuously imbued into a pipe, thereby setting oxygen concentration to 0.5 ppm or less.

Next, 0.14 g/monomer mol of sodium persulfate and 0.005 g/monomer mol of L-ascorbic acid were further mixed with the monomer aqueous solution (1) by line mixing, and was supplied to a flat steal belt with a side guard so that the mixture had the thickness of about 0.25 mm, so as to continuously carry out aqueous solution polymerization for 30 minutes. The hydrogel cross-linked polymer (i) obtained in this manner was crushed and then was fragmented into pieces each having a diameter of about 1 mm by a meat chopper whose diameter was 7 mm. These pieces were spread on a perforated plate of a band dryer and were continuously dried by hot air of 180° C. for 30 minutes, thereby obtaining a dried polymer.

The dried polymer was pulverized, and an entire amount of the resultant particulate dried polymer was continuously supplied to a triple roll granulator (roll gaps are 1.0 mm, 0.55 mm, and 0.42 mm downward) so as to pulverize the particulate dried polymer and then was classified by a sieving apparatus having metal sieve gauzes whose mesh sizes were 850 μm and 150 μm, thereby obtaining the water absorbent resin powder (1) containing about 98 mass % of particles whose particle diameter ranges from 850 to 150 μm (CRC=35 g/g). Table 1 shows results obtained by measuring properties of the water absorbent resin powder (1).

Further, the water absorbent resin powder (1) is continuously supplied to a high speed continuous mixer (turbulizer/ 1000 rpm) at 1000 kg/hr, and a surface cross-linking agent aqueous solution including 1.0 mass % of propyleneglycol, 2.5 mass % of water, and 0.5 mass % of aluminum sulfate octadecahydrate (each amount thereof is relative to the water absorbent resin powder) was sprayed with each droplet having a diameter of about 250 μm so as to be mixed with the water absorbent resin powder (1).

Subsequently, the resultant mixture was continuously heated at 195° C. for 40 minutes by a paddle dryer, and then was forcibly cooled down to 60° C. Further, particles (2) having passed through a metal gauze whose mesh size was 850 μm were classified by using the sieving apparatus having the metal gauze, and particles (1) having not passed through the metal gauze whose mesh size was 850 μm were pulverized again and were mixed with the particles (2), thereby obtaining water absorbent resin powder (2) entirely constituted of particles having passed through the 850 μm metal gauze (water absorbent resin powder (1) whose surface had been cross-linked by propyleneglycol and aluminum sulfate).

Table 1 shows results obtained by measuring properties of the resultant water absorbent resin powder (2). Note that, the water absorbent resin powder (2) was packaged into a non-permeable bag so that each bag contained 500 Kg of the water absorbent resin powder (2) as a single Lot.

TABLE 1

|  | ABSORBENCY (g/g) | ABSORBENCY AGAINST PRESSURE (g/g) | SALINE FLOW CONDUCTIVITY (SFC) ($\times 10^{-7} (cm^3 \times s \times g^{-1})$) |
|---|---|---|---|
| WATER ABSORBENT RESIN POWDER (1) | 35 | 10≤ | 1 |
| WATER ABSORBENT RESIN POWDER (2) | 30 | 23 | 60 |

In each water absorbent resin powder, a mass average particle diameter is about 390 μm, an extractable polymer content is about 13 mass %, a color is white (YI = about 10), and a solid content is about 99 mass %.

Comparative Example 1

In Production Example 1, 300 g of the water absorbent resin powder was arbitrarily retrieved from Lot of the water absorbent resin powder (1) and was spread into a single layer whose area size was about 1 m$^2$, and then whether there were any foreign matters or not were checked. There was confirmed a ratio of Lots each of which included one or more foreign matters (black particles) in 300 g of particles (entirely having passed through the 850 μm metal gauze) spread into a layer of 1 m$^2$. As a result, the foreign matters were contained in about 9% of the entire Lots (9 lots/100 lots).

Example 1

Color particles having passed through the 850 μm metal gauze of Production Example 1 were monitored by an image sensor, and a certain amount of powder was retrieved from an automatic damper by detecting the color particles, and only the retrieved color particles were sorted. Out of the color particles, only color-sorted particles (1') having passed through the 850 μm metal gauze were subjected to the foregoing step again. As in Production Example 1, the particles (1') were pulverized and were mixed with the particles (2), thereby obtaining water absorbent resin powder (1A) entirely constituted of particles having passed through the 850 μm metal gauze. As a result, the ratio of Lots including foreign matters in the water absorbent resin powder (1A) was decreased to 6% (6 lots/100 lots). Note that, a ratio at which the color particles were removed from the color-sorted particles (1) having passed through the 850 μm metal gauze was 66%, and a ratio of the color-sorted particles having passed through the 850 μm metal gauze was about 50% with respect to an entire amount of the foreign matters.

Example 2

As to the water absorbent resin powder (2) including about 6000 foreign matters (black foreign substances) per 1000 kg of particles, an entire amount of the particles (a ratio of particles whose particle size distribution ranged from 850 to 150 g/m was 98%) was subjected to color sorting, by using a color sorting apparatus "Final Sorter" (product of SATAKE CORPORATION) having a single side monitoring camera, at a throughput of 470 Kg/h. As a result, an yield was 95.6%, a sorting ability was 90%, and 90% of the foreign matters was removed, and the foreign matters were substantially not found by eyes.

Example 3

The same operation as Example 2 was carried out except that the throughput of the color sorting apparatus was changed to 3500 Kg/h. As a result, the yield was 98.6%, the sorting ability was 43%, and the foreign matters were hardly found by eyes.

Example 4

The yield of the water absorbent resin powder having been color-sorted (first sorting) in Example 2 was 95.6%, and 4.4% of the water absorbent resin powder including foreign matters was further color-sorted (second sorting). As a result, the yield increased to 99.9%.
(Production Example 2 in which Water Absorbent Resin Powder is Produced)

On the basis of Example 8 of U.S. Patent Publication No. 2007-041796, continuous belt polymerization was carried out, thereby obtaining water absorbent resin powder whose surface had been cross-linked by aluminum sulfate and which included hexahedral (cubical) particles having an average particle diameter of 4 mm.

That is, on the basis of Example 8 of U.S. Patent Publication No. 2007-041796, a monomer aqueous solution was prepared by sufficiently mixing a monomer including 15.9 kg of acrylic acid and 173.4 kg of 37 mass % sodium acrylate aqueous solution, 104.6 g of polyethyleneglycol diacrylate (n=9), 7.9 kg of ion exchange water, and 2.7 kg of 15 mass % polyethyleneglycol (commercial name: Polyethyleneglycol 6000, produced by NOF CORPORATION) aqueous solution. Then, a solution containing 3% of hydroxy cyclohexyl phenylketone and sodium persulfate was used as a polymerization initiator, and an endless steel belt was used to carry out continuous belt polymerization while emitting an ultraviolet ray.

A moisture content of a resultant hydrogel was 45.0 mass % and the thickness of the hydrogel was 4.5 mm. The hydrogel contained hexahedral particles each of which was a cube of about 4 mm×4 mm×4 mm. Note that, in cutting the hydrogel, 19.05 mass % of propyleneglycol was sprayed so as to coat a surface of the hydrogel. Further, 600 g of 10 mass % aluminum sulfate aqueous solution was sprayed to 40 kg of the hydrogel, and then the hydrogel was dried by hot air of 150° C. for 50 minutes so as to carry out the drying at the same time as the surface cross-linking. Further, agglomerates were sorted.

A moisture content of resultant water absorbent resin powder (3) was 12%. A mass average particle diameter was 4.0 mm, and an amount of fine powder whose particle diameter was 150 g/m or less was 0%, and a logarithmic standard deviation σζ was 0.18 (for detail information, see U.S. Patent Publication No. 2007-041796).

Comparative Example 2

Continuous production including the continuous belt polymerization was carried out by linking the respective steps of Production Example 2, so that no foreign matters were initially found. However, after several-month operation, four black foreign matters were found in 10 kg of the water absorbent resin powder on average at the time of temporary stoppage of the operation.

Example 5

The same operation as Comparative Example 2 except that the water absorbent resin was supplied to Kubota powdery foreign substance sorter "PLATON" (product of Kubota Corporation) at 150 kg/h right before packaging a final product and at a final step of the continuous production and was color-sorted. As a result, the yield was 99.5%, and 100% of the foreign matters were removed from the water absorbent resin whose yield was 99.5%.

Example 6

The yield of the water absorbent resin powder having been color-sorted (first sorting) in Example 5 was 99.5%, and 0.5% of the water absorbent resin powder including foreign matters was further color-sorted (second sorting). As a result, the yield increased to 99.99% and 100% of the foreign matters were removed.

Note that, when the foreign matters were removed in Examples 1 to 6, there was no change or there was slight improvement in properties by several points before and after the color sorting.
(Production Example 3 in which Water Absorbent Resin Powder is Produced)

On the basis of Example 1 of U.S. Pat. No. 6,867,269, continuous kneader polymerization was carried out, thereby obtaining water absorbent resin powder (4).

That is, a mixture solution (concentration was 45% and temperature was 97° C.) was prepared by mixing 493.2 g of acrylic acid, 396.1 g of aqueous solution containing 48 mass % of sodium hydroxide, 419.6 g of water, 6.0 g of aqueous solution containing 0.5 mass % of diethylenetriamine pentaacetate and pentasodium, 1.0 g of polyethyleneglycoldiacrylate (average polyethyleneglycol unit number: 8) serving as an internal cross-linking agent, and 11.3 g of aqueous solution containing 3 mass % of sodium persulfate, in a line mixing manner, and the mixture solution was continuously supplied to a continuous kneader (CKDJS-40 produced by DALTON CO., LTD) serving as a polymerization container having a biaxial stirring vane so that the foregoing amounts were supplied per minute. The hydrogel cross-linked polymer was sheared and the crushed hydrogel (4) was continuously discharged from the polymerization container.

The resultant hydrogel (4) was dried with hot air of 170° C. for 40 minutes and was further pulverized and classified, thereby obtaining about 36 kg of water absorbent resin powder (4) (GVs=39 g/g, soluble content was 12%) per hour (for detail information, see U.S. Pat. No. 6,867,269).

(Production Example 4 in which Water Absorbent Resin Powder is Produced)

As in Production Example 1, the water absorbent resin powder was subjected to surface cross-linking, thereby obtaining water absorbent resin powder (5).

Comparative Example 3

As to the water absorbent resin powder (5) continuously obtained through Production Example 3 and Production Example 4, when continuous production thereof was continued, about 4000 foreign matters occurred in 1000 kg of particles.

Example 7

After a final step of the continuous production steps, the water absorbent resin powder (5) continuously obtained through Production Example 3 and Production Example 4 was continuously subjected to the first and second sorting in line by using Kubota powdery foreign substance sorter "PLATON" (product of Kubota Corporation). As a result, the yield was 99.8%. Further, 97% of the foreign matters were removed.

Example 8

As to the water absorbent resin powder obtained by carrying out the first and second sorting in Example 7, properties thereof were measured. As a result, even after producing 100 ton of the water absorbent resin powder, (a) PUPP was 65%, (b) an amount of contained foreign matters was 0 mm$^2$/100 g, (c) an amount of fine powder whose particle diameter was 150 g/m or less was 0.1 mass %, D50=380 μm, σζ=0.33, AAP was 23 g/g, a residual monomer was 300 ppm, and a solid content was about 99 mass %.

Example 9

On the basis of WO2006-109844, 50 wt % of water absorbent resin powder and 50 wt % of pulp were dry blended, thereby producing a core whose diameter was 9 cm and basic weight was 2 g/cm$^2$.

As to the core (an absorption layer model of a diaper), substantially no foreign matters were found in the water absorbent resin powder obtained in Examples 1 to 4 and Example 7. While, in the water absorbent resin powder of Comparative Examples 1 and 3, foreign matters in the pulp were relatively easily confirmed.

On the basis of WO2006-109844, a re-wet of the water absorbent resin powder obtained in Example 8 was measured with 25 ml of physiological saline and at a load of 4.9 kPa. As a result, the re-wet was 5 g. This is a favorable value.

As described above, a method according to the present invention for producing water absorbent resin powder whose mass average particle diameter defined by sieve classification is 300 μm or more and 10 mm or less and which contains less than 10% by mass of fine powder having a particle diameter of 150 μm or less and has a surface cross-linked structure, said method being characterized by comprising: a polymerization step in which an unsaturated monomer aqueous solution is polymerized; a drying step in which a hydrogel cross-linked polymer obtained in the polymerization step is dried; a surface treatment step in which the hydrogel cross-linked polymer or a dried hydrogel cross-linked polymer is subjected to a surface treatment; and a sorting step, carried out after the drying step, in which a foreign matter included in a water absorbent resin is color-sorted from the water absorbent resin entirely or partially.

Thus, as to high-property-water absorbent resin powder in which foreign matters are likely to occur, it is possible to improve a production efficiency and it is possible to efficiently provide a water absorbent resin which is free from uncomfortable appearance, has excellent whiteness, and is less likely to be colored.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

As described above, the present invention includes as a production step a sorting step adopting a color sorting technique, so that it is possible to efficiently remove black or brown foreign matters which are likely to occur in continuously producing a water absorbent resin having particularly high properties. Thus, the present invention is widely applicable to fields concerning production of sanitary materials such as diapers required to have high properties and excellent whiteness.

The invention claimed is:

1. A method for producing water absorbent resin powder whose mass average particle diameter defined by sieve classification is between 300 μm and 600 μm and which contains less than 10% by mass of fine powder having a particle diameter of 150 μm or less and has a surface cross-linked structure,
said method being characterized by comprising:
a polymerization step in which an unsaturated monomer aqueous solution is polymerized;
a drying step in which a hydrogel cross-linked polymer obtained in the polymerization step is dried;
a surface treatment step in which the hydrogel cross-linked polymer or a dried hydrogel cross-linked polymer is subjected to a surface treatment; and
a sorting step, carried out after the surface-crosslinking in the surface treatment step, in which
with respect to a Lot, in which particles of a foreign matter that is nonmagnetic and colored organic substance are dotted in white water absorbent resin powder, which has a yellow index YI≤15, color sorting is carried out at least once so as to sort and remove particles of a black or brown foreign matter contained in the white water absorbent resin.

2. The method as set forth in claim 1, wherein an air jet is emitted so as to color-sort the foreign matter.

3. The method as set forth in claim 1, wherein a digital image process is carried out so as to color-sort the foreign matter.

4. The method as set forth in claim 1, wherein the drying step and the surface treatment step are carried out by heating the hydrogel cross-linked polymer or the dried hydrogel cross-linked polymer at 150° C. or higher and 250° C. or lower.

5. The method as set forth in claim 1, further comprising a continuous transport step, carried out after the drying step, which links a pulverization step, a classification step, and production steps, wherein production is continuously carried out for 30 days or more and 1000 days or less.

6. The method as set forth in claim 1, wherein 20 Kg to 200000 Kg of the water absorbent resin is packaged into each non-permeable bag or each non-permeable container and the sorting step is carried out right before or right after packaging a final product.

7. The method as set forth in claim 1, wherein the water absorbent resin subjected to the color-sorting is water absorbent resin powder obtained by carrying out cross-linking polymerization with respect to an unsaturated monomer containing acrylic acid and/or salt thereof as a main component, and the water absorbent resin satisfies the following properties:
   (a) an absorbency against pressure (AAP: 0.90 g) is 20 g/g or more and 60 g/g or less;
   (b) an amount of fine powder whose particle diameter is 150 μm or less is 0 mass % or more and 5 mass % or less, and a mass average particle diameter (D50) is 300 μm or more and 600 μm or less, and a particle size distribution logarithmic standard deviation (σζ) is 0.20 or more and 0.40 or less, defined by standard sieve classification,
   where the absorbency against pressure (AAP: 0.90 g) represents an absorbency of 0.9 g of a particulate water absorbing agent for 0.90 mass % sodium chloride aqueous solution under a pressure of 4.8 kPa for 60 minutes.

8. The method as set forth in claim 1, wherein the color-sorting is repeated plural times.

9. The method as set forth in claim 1, wherein aqueous solution polymerization is carried out as the polymerization.

10. The method of claim 1, wherein a foreign matter included in a water absorbent resin whose particle diameter is 850 μm or more defined in standard sieve classification and being a nonmagnetic and colored organic substance is color-sorted from the water absorbent resin entirely or partially.

11. The method of claim 1, wherein the sorting step is carried out twice or more in order to more accurately remove the foreign matters.

12. The method of claim 1, wherein the water absorbent resin powder is observed by eyes before the sorting step.

13. The method of claim 1, wherein the sorting step is carried out with respect to a packaged product (i) which has been prepared by packaging each final product and (ii) in which particles of particles of a foreign matter have been found.

14. The method of claim 1, wherein permeability potential under pressure (PUPP) of the water absorbent resin powder is 50% or more and 100% or less.

* * * * *